US009026536B2

(12) United States Patent
Denney et al.

(10) Patent No.: US 9,026,536 B2
(45) Date of Patent: May 5, 2015

(54) SYSTEMS AND METHODS FOR CLUSTER COMPARISON

(75) Inventors: Bradley Denney, Irvine, CA (US); Anoop Korattikara-Balan, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 169 days.

(21) Appl. No.: 13/879,002

(22) PCT Filed: Oct. 17, 2011

(86) PCT No.: PCT/US2011/056567
§ 371 (c)(1), (2), (4) Date: May 22, 2013

(87) PCT Pub. No.: WO2012/054399
PCT Pub. Date: Apr. 26, 2012

(65) Prior Publication Data

US 2013/0238626 A1 Sep. 12, 2013

Related U.S. Application Data

(63) Continuation-in-part of application No. 12/906,106, filed on Oct. 17, 2010, now Pat. No. 8,571,333.

(51) Int. Cl.
*G06F 7/00* (2006.01)
*G06F 17/30* (2006.01)
*G06K 9/00* (2006.01)

(52) U.S. Cl.
CPC .... *G06F 17/30244* (2013.01); *G06F 17/30705* (2013.01); *G06F 17/30247* (2013.01); *G06K 9/00744* (2013.01); *G06F 17/3028* (2013.01)

(58) Field of Classification Search
None
See application file for complete search history.

(56) References Cited

U.S. PATENT DOCUMENTS

| | | | | |
|---|---|---|---|---|
| 5,438,676 | A | 8/1995 | Schwanke | |
| 8,346,772 | B2 * | 1/2013 | Bhattacharya et al. | 707/737 |
| 8,463,784 | B1 * | 6/2013 | Bekkerman et al. | 707/737 |
| 8,560,488 | B2 * | 10/2013 | Yoshimoto | 706/52 |
| 2004/0243602 | A1 * | 12/2004 | Shiiyama | 707/100 |
| 2005/0286767 | A1 * | 12/2005 | Hager et al. | 382/190 |
| 2006/0010115 | A1 * | 1/2006 | Yoshida et al. | 707/3 |
| 2006/0015497 | A1 * | 1/2006 | Keating et al. | 707/6 |

(Continued)

OTHER PUBLICATIONS

Ludmila I. Kuncheva, Using Diversity in Cluster Ensembles, 2004 IEEE International Conference, Systems, Man and Cybernetics, Oct. 2004.

(Continued)

*Primary Examiner* — Hexing Liu
(74) *Attorney, Agent, or Firm* — Canon U.S.A., Inc. IP Division

(57) ABSTRACT

Systems and methods for measuring similarity between a first set of clusters and a second set of clusters apply a first clustering procedure and a second clustering procedure to a set of objects to cluster the objects into a first set of clusters and a second set of clusters, respectively, calculate a similarity index between the first set of clusters and the second set of clusters, calculate an expected value of the similarity index, wherein the expected value is a value of the similarity index one would expect to obtain, on average, between a randomly generated third set of clusters and a randomly generated fourth set of clusters with a same number of clusters as the first set of clusters and the second set of clusters, respectively, and adjust the calculated similarity index based on the expected value of the similarity index.

24 Claims, 18 Drawing Sheets

(56) References Cited

U.S. PATENT DOCUMENTS

| | | | | |
|---|---|---|---|---|
| 2006/0080040 | A1 | 4/2006 | Garczarek | |
| 2006/0101060 | A1 | 5/2006 | Li | |
| 2006/0294060 | A1 * | 12/2006 | Masuyama | 707/3 |
| 2007/0022112 | A1 * | 1/2007 | Asukai et al. | 707/5 |
| 2007/0061319 | A1 * | 3/2007 | Bergholz | 707/5 |
| 2007/0239741 | A1 | 10/2007 | Jordahl | |
| 2010/0092073 | A1 | 4/2010 | Prokhorov | |
| 2010/0153318 | A1 | 6/2010 | Branavan | |
| 2010/0157089 | A1 * | 6/2010 | Pakulski et al. | 348/222.1 |
| 2011/0134128 | A1 | 6/2011 | Hu | |
| 2012/0087589 | A1 * | 4/2012 | Chang-Tsun et al. | 382/190 |
| 2012/0096359 | A1 * | 4/2012 | Denney et al. | 715/730 |

OTHER PUBLICATIONS

N.X. Vinh et al. Information theoretic measures for clusterings comparison: is a correction for chance necessary? In Proceedings of the 26th Annual International Conference on Machine Learning, pp. 1073-1080. ACM, 2009.

A. Strehl and J. Ghosh. Cluster ensembles—a knowledge reuse framework for combining multiple partitions. The Journal of Machine Learning Research, 3:583-617, 2003.

Ahmed N. Albatineh et al. On Similarity Indices and Correction for Chance Agreement. Journal of Classification 23:301-313 (2006).

M. Meila. Comparing Clusterings. UW Statistics Technical Report 418 and COLT, 2003.

M. Meila. Comparing clusterings: an axiomatic view. In Proceedings of the 22nd international conference on Machine learning, pp. 577-584. ACM, 2005.

N.X. Vinh et al. Information Theoretic Measures for Clusterings Comparison: Variants, Properties, Normalization and Correction for Chance. Journal of Machine Learning Research 11 (2010) 2837-2854.

Matthijs J. Warrens. On Similarity Coefficients for 2×2 Tables and Correction for Chance. Psychometrika vol. 73, No. 3, 487-502 (2008).

* cited by examiner

| $\upsilon/\nu$ | $v_1$ | $v_2$ | ... | $v_c$ | Sums |
|---|---|---|---|---|---|
| $u_1$ | $M_{11}$ | $M_{12}$ | ... | $M_{1C}$ | $a_1$ |
| $u_2$ | $M_{21}$ | $M_{22}$ | ... | $M_{2C}$ | $a_2$ |
| ⋮ | ⋮ | ⋮ | ⋱ | ⋮ | ⋮ |
| $u_R$ | $M_{R1}$ | $M_{R2}$ | ... | $M_{RC}$ | $a_R$ |
| Sums | $b_1$ | $b_2$ | ... | $b_C$ | N |

| | |
|---|---|
| 2 | 0 |
| 0 | 2 |

(a) U vs. V1

| | | |
|---|---|---|
| 2 | 0 | 0 |
| 0 | 1 | 1 |

(b) U vs. V2

| | | | |
|---|---|---|---|
| 1 | 1 | 0 | 0 |
| 0 | 0 | 1 | 1 |

(c) U vs. V3

(a) (b) (c)

900A

| U / V | $v_1$ | $v_2$ | $v_3$ | $v_4$ | $v_5$ | $v_6$ | Sums |
|---|---|---|---|---|---|---|---|
| $u_1$ | $M_{11}$ | $M_{12}$ | $M_{13}$ | $M_{14}$ | $M_{15}$ | $M_{16}$ | 3 |
| $u_2$ | $M_{21}$ | $M_{22}$ | $M_{23}$ | $M_{24}$ | $M_{25}$ | $M_{26}$ | 10 |
| $u_3$ | $M_{31}$ | $M_{32}$ | $M_{33}$ | $M_{34}$ | $M_{35}$ | $M_{36}$ | 11 |
| $u_4$ | $M_{41}$ | $M_{42}$ | $M_{43}$ | $M_{44}$ | $M_{45}$ | $M_{46}$ | 11 |
| Sums | $b_1$ | $b_2$ | $b_3$ | $b_4$ | $b_5$ | $b_6$ | 35 |

| U / V | $v_1$ | $v_2$ | $v_3$ | $v_4$ | $v_5$ | $v_6$ | Sums |
|---|---|---|---|---|---|---|---|
| $u_1$ | 0 | 2 | 0 | 0 | 1 | 0 | 3 |
| $u_2$ | 5 | 1 | 1 | 3 | 0 | 0 | 10 |
| $u_3$ | 3 | 2 | 1 | 0 | 2 | 3 | 11 |
| $u_4$ | 0 | 0 | 3 | 5 | 0 | 3 | 11 |
| Sums | 8 | 5 | 5 | 8 | 3 | 6 | 35 |

| U / V | $V_1$ | $V_2$ | $V_3$ | $V_4$ | $V_5$ | $V_6$ | Sums |
|---|---|---|---|---|---|---|---|
| $U_1$ | 1 | 0 | 0 | 1 | 1 | 0 | 3 |
| $U_2$ | 0 | 1 | 0 | 3 | 4 | 2 | 10 |
| $U_3$ | 3 | 6 | 0 | 0 | 2 | 0 | 11 |
| $U_4$ | 2 | 0 | 5 | 0 | 2 | 2 | 11 |
| Sums | 6 | 7 | 5 | 4 | 9 | 4 | 35 |

| U / V | $V_1$ | $V_2$ | $V_3$ | $V_4$ | $V_5$ | $V_6$ | Sums |
|---|---|---|---|---|---|---|---|
| $U_1$ | 3 | 1 | 0 | 0 | 5 | 0 | 9 |
| $U_2$ | 3 | 3 | 0 | 2 | 2 | 3 | 13 |
| $U_3$ | 0 | 3 | 5 | 0 | 0 | 0 | 8 |
| $U_4$ | 0 | 0 | 0 | 2 | 2 | 1 | 5 |
| Sums | 6 | 7 | 5 | 4 | 9 | 4 | 35 |

FIG. 10B

$$A\text{-}MWV = B\text{-}MWT \binom{N}{a} \frac{\left\{ {N-a \atop R-1} \right\}}{\left\{ {N \atop R} \right\}}$$

$$B\text{-}MWV = SWT \binom{N}{b} \frac{\left\{ {N-b \atop C-1} \right\}}{\left\{ {N \atop C} \right\}}$$

SYSTEMS AND METHODS FOR CLUSTER COMPARISON

CROSS-REFERENCE TO RELATED APPLICATIONS

This application is the national stage of PCT/US2011/056567, which is a continuation-in-part of U.S. patent application Ser. No. 12/906,106, filed on Oct. 17, 2010, which is hereby incorporated by reference in its entirety.

BACKGROUND

1. Field

The present disclosure relates to data clustering, and more particularly relates to organizing objects into clusters of related objects, such as organizing a group of images into one or more clusters of related images.

2. Background

In the field of digital imaging, a large set of images may be partitioned into smaller clusters of images. For example, a computing device may organize a large collection of images into a two or more clusters of images in which the images in a certain cluster are similar to each other. To that end, a number of different clustering procedures have been developed to automatically cluster images based on features of the images.

The performance of a clustering procedure may vary depending on the set of images being clustered. Thus, in some situations it may be better to choose one clustering procedure over another.

SUMMARY

Mutual Information (also referred to herein as "MI") is an example of an information theoretical measure that has been used to measure similarity between two partitions or clustering results of the same data. The MI measures how closely two different clustering procedures place the same objects in the same clusters, but it lacks an interpretable baseline, which hinders its usability. There is an adjusted form of MI, referred to as the Adjusted Mutual Information (also referred to herein as "AMI") that provides MI with an interpretable baseline by subtracting out the expected value of the MI. The value of AMI indicates how well the two partitions or clustering results agree when compared to the agreement obtained by chance.

AMI is based on a model of randomness where the size of the partitions or clusters is assumed to be known and fixed. However, when comparing the results obtained by clustering algorithms, it may be necessary to account for partitions or clusters that do not have a predetermined size, but instead a size that is determined by the partitioning or clustering algorithm.

Also, the Rand index is a similarity measure for comparing two clusterings. The Rand index is a pair counting measure that is defined as the fraction of pairs that are either in the same set in both the partitions or in different sets in both the partitions. However, the Rand index suffers from some of the same shortcomings as MI.

Thus, while MI and the Rand index can indicate cluster similarity, they do not appropriately account for results, e.g., cluster sizes and object assignments into clusters, that are obtained by chance.

In one embodiment, a method for measuring similarity between a first set of clusters generated by a first clustering procedure and a second set of clusters generated by a second clustering procedure comprises applying a first clustering procedure and a second clustering procedure to a set of objects to cluster the objects into a first set of clusters and a second set of clusters, respectively, and calculating a similarity index between the first set of clusters and the second set of clusters. The method further comprises calculating an expected value of the similarity index, wherein the expected value is a value of the similarity index one would expect to obtain, on average, between a randomly generated third set of clusters and a randomly generated fourth set of clusters with a same number of clusters as the first set of clusters and the second set of clusters, respectively, and adjusting the calculated similarity index by a penalty factor that includes the expected value of the similarity index.

In one embodiment, a system for measuring similarity between a first set of clusters generated by a first clustering procedure and a second set of clusters generated by a second clustering procedure comprises a computer-readable medium configured to store computer-executable instructions, and one or more processors configured to cause the system to retrieve a set of objects from one or more computer-readable media, apply a first clustering procedure to the set of objects to sort the objects into a first set of clusters, wherein the first set of clusters has a first number of clusters, and apply a second clustering procedure to the set of objects to sort the objects into a second set of clusters, wherein the second set of clusters has a second number of clusters. The one or more processors are further configured to cause the system to calculate a similarity index between the first set of clusters and the second set of clusters, calculate an expected value of the similarity index, wherein the expected value is an average value of the similarity index between a randomly generated third set of clusters and a randomly generated fourth set of clusters, wherein the third set of clusters has at most a same number of clusters as the first number of clusters and the fourth set of clusters has at most a same number of clusters as the second number of clusters, and adjust the calculated similarity index by a penalty factor that includes the expected value of the similarity index.

In one embodiment, one or more computer-readable media store instructions that, when executed by one or more computing devices, cause the one or more computing devices to perform operations comprising performing a first clustering procedure on a set of objects to generate a first set of clusters, performing a second clustering procedure on the set of objects to generate a second set of clusters, and calculating a similarity index between the first set of clusters and the second set of clusters. The operations further comprise calculating an expected value of the similarity index, wherein the expected value is a weighted average of possible values of the similarity index between a randomly generated third set of clusters and a randomly generated fourth set of clusters, wherein the third set of clusters has a same number of clusters as the first set of clusters and the fourth set of clusters has a same number of clusters as the second set of clusters, and modifying the calculated similarity index by a penalty factor that includes the expected value of the similarity index.

This brief summary has been provided so that the nature of this disclosure may be understood quickly. A more complete understanding can be obtained by reference to the following detailed description and to the attached drawings.

BRIEF DESCRIPTION OF THE DRAWINGS

FIG. 9A illustrates an example embodiment of a contingency table generated based on the randomly generated clusters shown in FIG. 7A.

FIG. 9B illustrates an example embodiment of a contingency table generated based on the randomly generated clusters shown in FIGS. 7A and 8A.

FIG. 10A illustrates an example embodiment of a contingency table generated based on the randomly generated clusters shown in FIGS. 7A and 8B.

FIG. 10B illustrates an example embodiment of a contingency table generated based on the randomly generated clusters shown in FIGS. 7B and 8B.

DESCRIPTION

Figure 1:
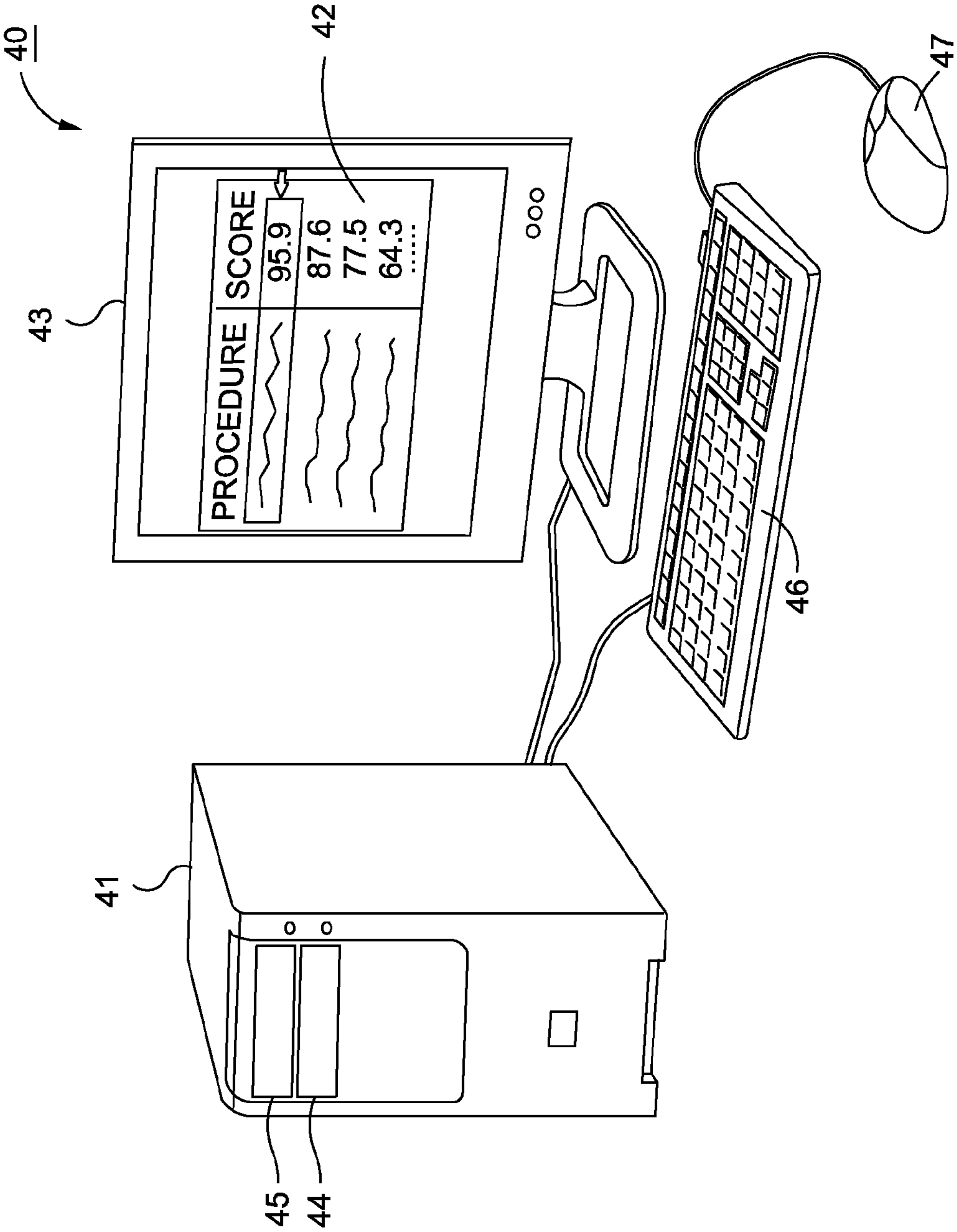
FIG. 1 is a representative view of computing equipment relevant to one example embodiment.

FIG. 1 is a representative view of computing equipment relevant to one example embodiment. Computing equipment 40 includes host computer 41 which generally comprises a programmable general purpose personal computer (also referred to herein as a "PC", though computer and PC may refer to any computing device, including, for example, a desktop computer, a server, a PDA, a laptop, a tablet, a phone) having an operating system such as Microsoft® Windows® or Apple® Mac OS® or LINUX, and which is programmed as described below so as to perform particular functions and in effect to become a special purpose computer when performing these functions. Computing equipment 40 includes color monitor 43 including display screen 42, keyboard 46 for entering text data and user commands, and pointing device 47. Pointing device 47 preferably comprises a mouse for pointing and for manipulating objects displayed on display screen 42.

Host computer 41 also includes computer-readable memory media such as computer hard disk 45 and DVD disk drive 44, which are constructed to store computer-readable information such as computer-executable instructions. DVD disk drive 44 provides a means whereby host computer 41 can access information, such as image data, computer-executable process steps, application programs, etc. stored on removable memory media. Other devices for accessing information stored on removable or remote media may also be provided.

Host computer 41 may acquire digital image data from other sources such as a digital video camera, a local area network, or the Internet via a network interface. Likewise, host computer 41 may interface with other color output devices, such as color output devices accessible over a network interface.

Display screen 42 displays a list of clustering procedures and a respective score for each procedure, along with a selection of the clustering procedure with the highest score. In that regard, while the below process will generally be described with respect to images for purposes of conciseness, it should be understood that other embodiments could also operate on other objects. For example, other embodiments could be directed to selecting a clustering procedure for clustering audio files, moving image files, documents, etc.

While FIG. 1 depicts host computer 41 as a personal computer, computing equipment for practicing aspects of the present disclosure can be implemented in a variety of embodiments, including, for example, a server, a laptop, a digital camera, mobile devices such as cell phones, ultra-mobile computers, netbooks, portable media players, or game consoles, among many others.

Figure 2:
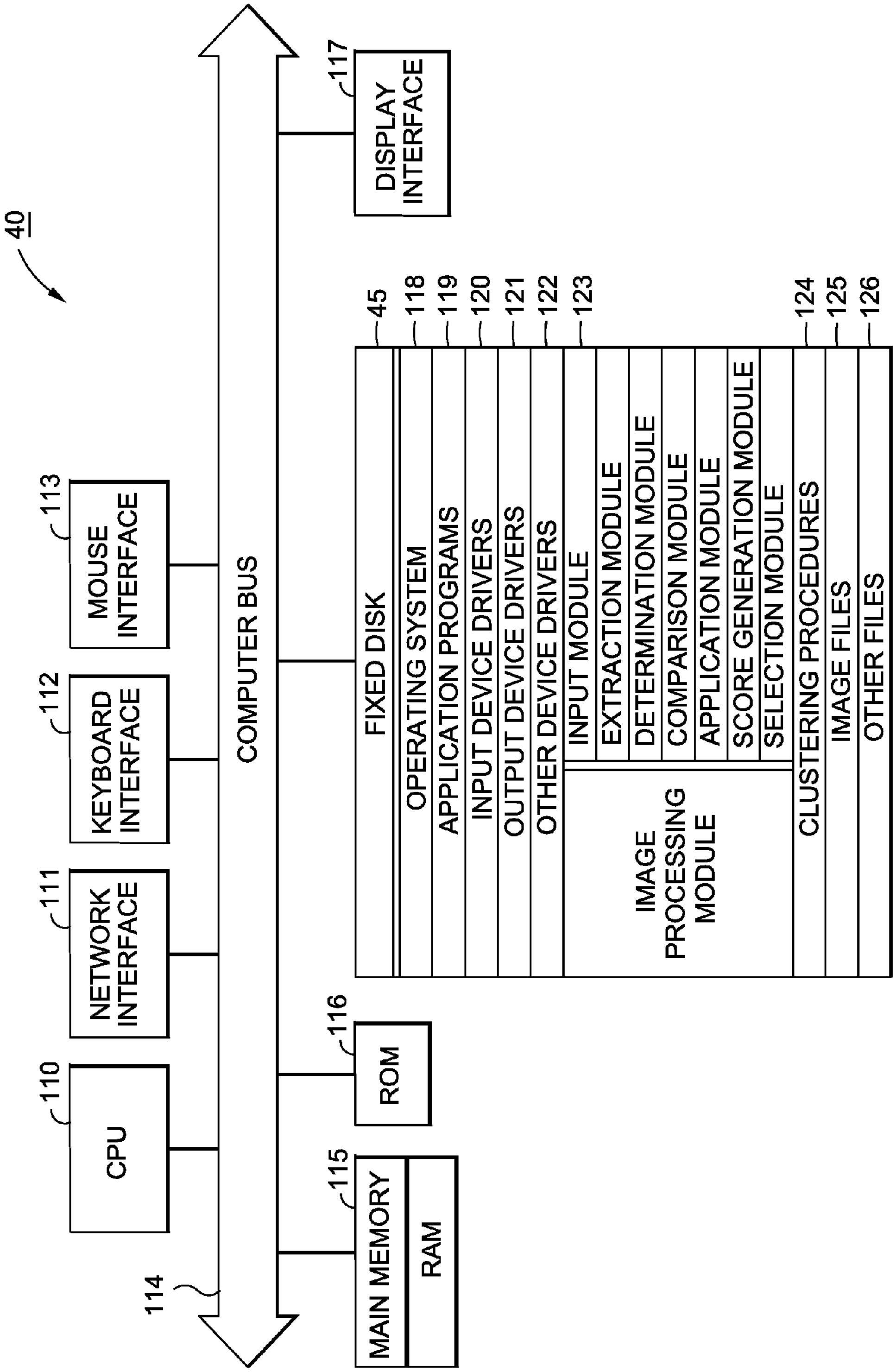
FIG. 2 is a detailed block diagram depicting the internal architecture of the host computer shown in FIG. 1.

FIG. 2 is a detailed block diagram showing the internal architecture of host computer 41 of computing equipment 40. As shown in FIG. 2, host computer 41 includes central processing unit (CPU) 110 which interfaces with computer bus 114. Also interfacing with computer bus 114 are hard disk 45, network interface 111, random access memory (RAM) 115 for use as a main run-time transient memory, read only memory (ROM) 116, display interface 117 for monitor 43, keyboard interface 112 for keyboard 46, and mouse interface 113 for pointing device 47.

RAM 115 interfaces with computer bus 114 so as to provide information stored in RAM 115 to CPU 110 during execution of the instructions in software programs such as an operating system, application programs, image processing modules, and device drivers. More specifically, CPU 110 first loads computer-executable process steps from fixed disk 45, or another storage device into a region of RAM 115. CPU 110 can then execute the stored process steps from RAM 115 in order to execute the loaded computer-executable process steps. Data such as color images or other information can be stored in RAM 115, so that the data can be accessed by CPU 110 during the execution of computer-executable software programs, to the extent that such software programs have a need to access and/or modify the data. A module includes computer-readable instructions that may be executed by one or more members (e.g., a CPU, direct mapped-memory) of one or more computing devices to cause the computing device(s) to perform certain operations, though for purposes of description a module may be described as performing the operations.

As also shown in FIG. 2, hard disk 45 contains computer-executable process steps for operating system 118, and application programs 119, such as graphic image management programs. Hard disk 45 also contains computer-executable process steps for device drivers for software interface to devices, such as input device drivers 120, output device drivers 121, and other device drivers 122. Clustering procedures 124 include a set of clustering procedures for clustering image files, audio files or other data. Image files 125, including color image files, and other files 126 are available for output to color output devices and for manipulation by application programs.

Image processing module 123 comprises computer-executable process steps, and generally comprises an input module, an extraction module, a determination module, a comparison module, an application module, a score generation module, and a selection module. Image processing module 123 inputs a set of images, and outputs a selection of a clustering procedure which best fits the set of images. More specifically, image processing module 123 comprises computer-executable process steps executed by a computer for causing the computer to perform a method for selecting a clustering procedure for grouping the set of images, as described more fully below.

The computer-executable process steps for image processing module 123 may be configured as a part of operating system 118, as part of an output device driver such as a printer driver, or as a stand-alone application program such as a color management system. They may also be configured as a plug-in or dynamic link library (DLL) to the operating system, device driver or application program. For example, image processing module 123 according to example embodiments may be incorporated in an output device driver for execution in a computing device, such as a printer driver, embedded in the firmware of an output device, such as a printer, in an input/output device such as a camera with a display, in a mobile output device (with or without an input camera) such as a cell-phone or music player, or provided in a stand-alone image management application for use on a general purpose computer. It can be appreciated that the present disclosure is not limited to these embodiments and that the disclosed image processing module 123 may be used in other environments in which image clustering is used.

Figure 3:
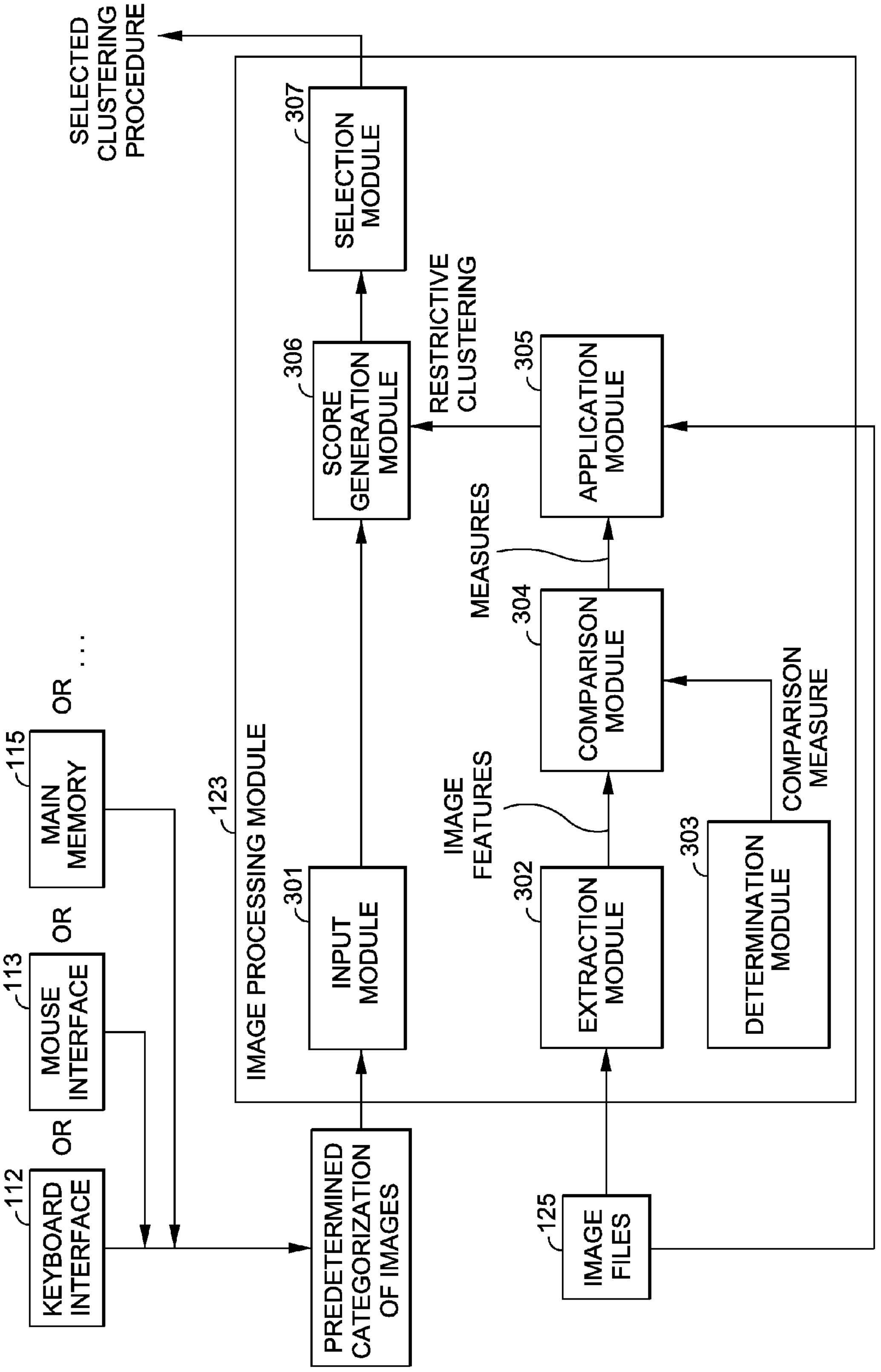
FIG. 3 is a representational view of an image processing module according to an example embodiment.

FIG. 3 illustrates the image processing module of FIG. 2 according to an example embodiment.

In particular, FIG. 3 illustrates an example architecture of image processing module 123 in which the sub-modules of image processing module 123 are included in fixed disk 45. Each of the sub-modules are computer-executable software code or process steps executable by a processor, such as CPU 110, and are stored on a computer-readable storage medium, such as fixed disk 45 or RAM 115. More or less modules may be used, and other architectures are possible.

As shown in FIG. 3, image processing module 123 includes an input module 301 for inputting color images and a predetermined categorization of the images, an extraction module 302 for extracting image features from each image in the set of images, and a determination module 303 for determining a comparison measure by which to compare respective features of the set of images. Comparison module 304 compares respective features between the images in the set of images based on the comparison measure, and outputs a group of measures representing the differences between features of respective images. Application module 305 applies plural clustering procedures to the set of images to cluster the images based in part on the calculated group of measures. Score generation module 306 generates a clustering quality score for each clustering procedure, based on the clusters created by the clustering procedure and the predetermined categorization of images. Selection module 307 selects a clustering procedure based on the clustering quality score. Each of these functions will be described more fully below.

Figure 4:
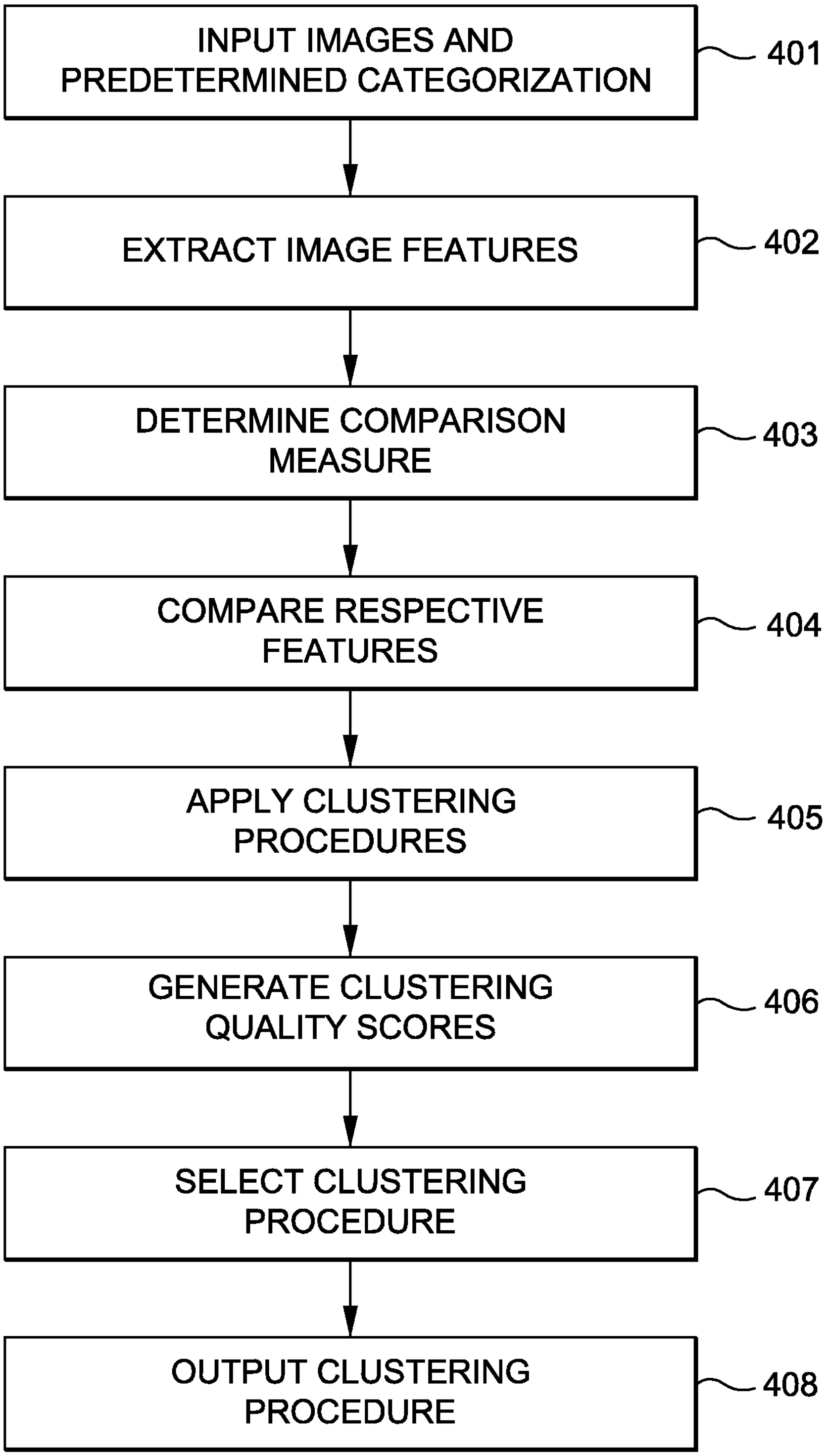
FIG. 4 is a flow diagram for explaining selection of a clustering procedure according to an example embodiment.

FIG. 4 is a flow diagram for explaining selection of a clustering procedure for grouping a set of images.

Briefly, in FIG. 4, a clustering procedure for grouping a set of images is selected from amongst plural clustering procedures. A predetermined categorization of objects such as images is input, and image features are extracted from each image in the set of images. A comparison measure is determined, by which to compare respective features of the set of images. Respective features between the images in the set of images are compared, based on the comparison measure, and a group of measures representing the differences between features of respective images is output. The plural clustering procedures are applied to the set of images to cluster the images based in part on the calculated group of measures. A clustering quality score is generated for each clustering procedure, based on the clusters created by the clustering procedure and the predetermined categorization of images. The clustering procedure is selected based on the clustering quality score.

In more detail, in step 401, a set of images are input, along with a predetermined categorization of the images. In that regard, the predetermined categorization of images can be generated by another clustering method, selected by a user, generated based on past categorizations of images, or generated using pre-labeled learning set of images, among other methods. For example, multiple user selections of categorizations could be aggregated and stored, or transmitted to computing equipment 40 over a network. Of course, the predetermined categorization could also be adjusted or modified over time, to keep up with changes in categorizations by users.

In step 402, image features are extracted from all of the input images. For example, colors, shapes, local features like SIFT bag of words, among many others can be extracted. In that regard, in many cases, clustering is not performed on the actual objects, but on features extracted from them. For example, a procedure for clustering images of cars does not usually operate in the pixel space of the images, but instead works with features, such as color or shape, extracted from the images. Thus, objects may be clustered based on features extracted from the objects.

In step 403, a comparison measure is determined, by which to compare respective features of the set of images. For example, the comparison measure could be a chi-squared distance, a "histogram intersection" measure, Cosine distance, Tanimoto coefficient, Lp distances, Earth movers distance, or Hamming distance, among many others.

In step 404, respective features between the images in the set of images are compared based on the comparison measure, and a group of measures representing the differences between features of respective images is output. In particular, each image is compared against every other image in the set, and the output measures indicate how similar (or different) the images are according to the selected comparison measure. As an example, for a collection of images, the feature could be a SIFT bag of words vector, which is generated for every image. Each image feature can be compared to every other feature using a cosine similarity measure which would generate a similarity score for every image pair in our collection of images.

Other features may be used as well. For example, if the objects are documents, the features may be words or phrases in the documents. Also, other data associated with the objects, including metadata, may be used, for example date of creation, date of modification, author, location of creation, device that created the object, time of day of creation of the object, type of object, etc.

In step 405, the plural clustering procedures are applied to the set of images to cluster the images, based in part on the calculated group of measures. In that regard, nearly every clustering procedure uses at least one such measure in the clustering process. Thus, each clustering procedure is executed on the set of images, based in part on the calculated set of measures, to generate resultant clusters. In that regard, nearly every clustering procedure uses at least one such measure in the clustering process. Thus, each clustering procedure is executed on the set of images, based in part on the calculated set of measures, to generate resultant clusters. In that regard, it should be understood that each clustering procedure involves a choice of feature, comparison measure, and specific clustering process. Thus, this step contemplates that the same clustering procedure could be used multiple times but with differing parameters, to thereby produce different results. Additionally some clustering procedures involve randomization in their processing steps and therefore can produce different results even with the same parameters. Thus this step can also contemplate the effectiveness of various versions of the same clustering procedure with the same parameters. For all practical purposes these can be considered as different clustering procedures to be evaluated.

In step 406, a clustering quality score is generated for each clustering procedure, based on the clusters created by the clustering procedure and the predetermined categorization of images.

For example, the clustering quality score can be generated for each clustering procedure by calculating a similarity index between the clustering procedure and the predetermined categorization of images, and adjusting by a penalty factor that is based on an expected index (also referred to herein as "EI") from randomly assigning images to clusters of the clustering procedure. A similarity index measures similarity between two partitions or clustering results of the same data. Example of similarity indexes includes MI and the Rand index. However, there are many other similarity indexes for measuring similarity of clustering results, and the methods described here can be applied to these other methods as well.

In one example embodiment the clustering quality score (also referred to herein as "AI" or "AI*") is generated according to $$AI^* = \frac{\hat{I}(M) - E[\hat{I}(M); R, C]}{K},$$

wherein the index $\hat{I}(M)$ equals the similarity index between the clustering procedure results and the predetermined categorization of images, $E[\hat{I}(M); R, C]$ equals the expected index and is based on the number of clusters R in the predetermined categorization (which may be generated by a clustering procedure) and number of clusters C generated by the clustering procedure, and wherein K is a normalization constant. Generation of AI* will be described more fully below with respect to FIGS. 5A to 5F.

In step 407, a clustering procedure is selected based on the clustering quality score. In some embodiments, it may be desirable to select the clustering procedure that has the highest quality score. However, in some embodiments it may be desirable to select a clustering procedure that has a quality score other than the highest, for example where it is desirable to have procedures that cluster objects differently.

In step 408, the selected clustering procedure is output. In that regard, the output clustering procedure may be displayed to the user as in FIG. 1, or may simply be stored or saved at computing equipment 41 for later use in grouping the same images or similar images. The selected clustering procedure could also be output over a network. Of course, many other methods of outputting the selected clustering procedure are possible.

Generation of the clustering quality score (e.g., AI*) will now be described more fully with respect to FIGS. 5A to 5F. The following description will use MI by way of example, though other embodiments may use other similarity indexes.

Figures 5A, 5B, 5C:
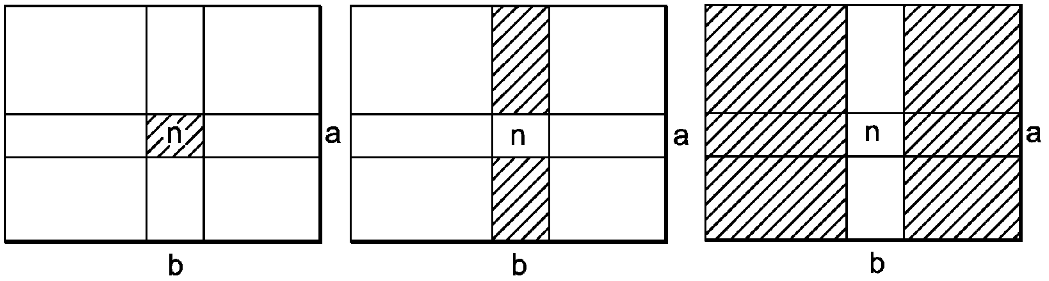
FIG. 5A is a view depicting a contingency table for explaining clustering according to an example embodiment.
FIG. 5B is a view for explaining mutual information.
FIG. 5C is a view for explaining elements of a cluster according to an example embodiment.

Turning to FIG. 5A, let $S=\{S_1, S_2, \ldots S_N\}$ be a set of N objects, where each $S_i$ belongs to one of R predetermined categories (which may be a partition of the N objects in R clusters), labeled $\mathcal{U}=\{U_1, U_2, \ldots U_R\}$. A clustering procedure produces a partition of these N objects into C clusters labeled $\mathcal{V}=\{V_1, V_2, \ldots V_C\}$.

The overlap between the predetermined categories, and the clusters produced by a clustering procedure, can be summarized in the form of a contingency table M shown in FIG. 5A, where table element $M_{ij}$ is the number of objects belonging to category $U_i$ that was placed into cluster $V_j$. We also define $a_i$=row sums, and $b_j$=column sums. This is shown in FIG. 5A. Formally, the mutual information I(X; Y) between discrete random variables X and Y is defined as $$I(X; Y) = \sum_{x \in \mathcal{X}} \sum_{y \in \mathcal{Y}} p(x, y) \log \frac{p(x, y)}{p(x)p(y)},$$

where $\mathcal{X}$ and $\mathcal{Y}$ are the domains of X and Y respectively. I(X; Y) is a symmetric measure that quantifies the information X and Y share. Entropy, denoted by H(X), is a measure of uncertainty associated with a random variable, X. Formally, $$H(X) = -\sum_{x \in \mathcal{X}} p(x) \log p(x).$$

It can be verified that I(X; Y)=H(X)−H(X|Y)=H(Y)−H(Y|X). Thus, MI is a measure of how much knowing one of the variables reduces uncertainty of the other. I(X; Y) is upper-bounded by both H(X) and H(Y).

Using a statistical view, random variables $U \in \mathcal{U}$ can be used to represent the category, and $V \in \mathcal{V}$ to represent the cluster, that an object belongs to. Then after observing a contingency table M, the following frequentist estimates are generated:

$$P_r(U = u_i) = \frac{\sum_{j=1}^{C} M_{ij}}{N} = \frac{a_i}{N},$$

$$P_r(V = v_j) = \frac{\sum_{i=1}^{R} M_{ij}}{N} = \frac{b_j}{N},$$

and $$P_r(U = u_i, V = v_j) = \frac{M_{ij}}{N}.$$

The mutual information between U and V can be estimated as $$\hat{I}(M) = \sum_{i=1}^{R} \sum_{j=1}^{C} \theta(M_{ij}, a_i, b_j),$$

-continued where $$\theta(n, a, b) = \frac{n}{N}\log\frac{nN}{ab}.$$

When comparing two partitions, V and V' with C and C' clusters respectively, against a predetermined partition U, if C=C', the MI of each of the two partitions to the predetermined partition, I(U; V) and I(U; V'), is a fair measure for comparing these clustering procedures.

However, if C≉C' this might not be the case. For example, suppose there is a comparison of 3 partitionings, $V_1$, $V_2$, and $V_3$ of a dataset consisting of two objects from one category and two objects from another. FIG. 5B shows the contingency tables of $V_1$, $V_2$, and $V_3$ with respect to U, the predetermined partition.

As shown in FIG. 5B, $V_1$ is the best possible clustering of the dataset whereas $V_3$ is a completely uninformative "clustering" since it placed each object in a separate "cluster". But it turns out that the mutual information for all the 3 contingency tables in FIG. 2 are the same (=H(U)). Additionally, any random partition of N objects into N categories, although completely uninformative, achieves the highest possible Mutual Information score with respect to the predetermined categorization.

Accordingly, a more informative measure should include a correction term to account for the similarity index (including the mutual information described above) that would be obtained by chance. That is, in order to evaluate procedures that partitions the data into R clusters in the first clustering (which may be the predetermined partitioning or another clustering procedure) and C clusters in the second clustering, the evaluation should take into account how much better these procedures do, on average, than a procedures that randomly partitions the same data into R and C clusters respectively.

Therefore, an expected index (also referred to herein as "EI" or "EI*") is calculated below. Then, EI* can be used as a baseline/penalty factor that can be subtracted from a similarity index (e.g., MI, Rand index) to obtain a more meaningful measure to compare a clustering procedure to a given clustering or to compare two clustering procedures. The difference is typically normalized to lie within a range, and the resulting measure can be called the adjusted index, denoted by AI*.

To calculate the expected index, given N objects, it would be useful to compute the expectation of the similarity index over all possible pairs of first and second clusterings of these objects into exactly R and C clusters respectively.

In that regard, $$EI^* = E[\hat{I}(M); R, C] = \sum_{M \in \mathcal{M}} \hat{I}(M)P(M; R, C),$$

where $\mathcal{M}$ is the set of all R×C contingency tables M, such that the row sums are non-zero, such that columns sums are non-zero, and P(M; R, C) is calculated as $$P(M; R, C) = \frac{\mathcal{N}(M)}{\sum_{M \in \mathcal{M}} \mathcal{N}(M)},$$

where $\mathcal{N}$ (M) is the number of ways to cluster the given objects that result in the contingency table M that have non-zero row sums and non-zero column sums. Plugging in the above, $$E[\hat{I}(M); R, C] = \sum_{M \in \mathcal{M}} \left\{ \left[ \sum_{i=1}^{R} \sum_{j=1}^{C} \theta(M_{ij}, a_i, b_j) \right] \frac{\mathcal{N}(M)}{\sum_{M \in \mathcal{M}} \mathcal{N}(M)} \right\}$$

$$= \frac{1}{\sum_{M \in \mathcal{M}} \mathcal{N}(M)} \sum_{i=1}^{R} \sum_{j=1}^{C} \sum_{M \in \mathcal{M}} \theta(M_{ij}, a_i, b_j)\mathcal{N}(M).$$

The summation over M above can be replaced with a summation over all possible values for $a_i$, $b_j$, and $M_{ij}$.

Considering the range of values that $a_i$, $b_j$, and $M_{ij}$ can take for some embodiments, since there must be at least one element in each row and column of M, $a_i$ has to be at least 1 and at most N−(R−1) and $b_j$ has to be at least 1 and at most N−(C−1). Given $a_i$ and $b_j$, $M_{ij}$ can be at most min($a_i$; $b_j$). Additionally, after filling the [i; j]th cell, the jth column must be filled with $b_j - M_{ij}$ elements from a pool of $N - a_i$ elements. Also, after filling the [i; j]th cell, the ith row must be filled with $a_i - M_{ij}$ elements from a pool of $N - b_j$ elements. Therefore, $M_{ij}$ should be at least $(a_i+b_j-N)+$, which is max(0; $a_i+b_j-N$).

To replace the summation over M as mentioned above, $\mathcal{N}$ (M) should be replaced with $\mathcal{N}$ ($M_{ij}$, $a_i$, $b_j$; R, C), where $\mathcal{N}$ (n, a, b; R, C) is the number of ways to cluster the given objects into exactly R clusters in the first clustering and C clusters in the second clustering such that there are n elements in a particular cell, and the number of elements in the corresponding row and column are a and b respectively. With this transformation, $$E[\hat{I}(M); R, C] = \frac{1}{\sum_{M \in \mathcal{M}} \mathcal{N}(M)} \sum_{i=1}^{R} \sum_{j=1}^{C} \sum_{a=1}^{N-R+1} \sum_{b=1}^{N-C+1} \sum_{n=(a+b-N)^+}^{min(a,b)} \theta(n, a, b)\mathcal{N}(n, a, b; R, C).$$

Since the categories of the objects are given, the denominator in the above equations is simply the number of ways to partition N distinguishable objects into R distinguishable non-empty bins in the first clustering and C distinguishable non-empty bins in the second, i.e.:

$$\sum_{M \in \mathcal{M}} \mathcal{N}(M) = S(N, C)S(N, R)C!R!,$$

where S denotes a Stirling number of the second kind.

Turning to FIG. 5C, $\mathcal{N}$ (n, a, b; R, C) can be calculated. As mentioned, this is the number of ways to cluster the given N objects into exactly R first clusters and C second clusters so that a given cell contains n elements and there are a and b elements in the cell's corresponding row and column, respectively. Specifically, $$\mathcal{N}(n, a, b; R, C) = \binom{N}{a}\binom{a}{n}\binom{N-a}{b-n}S(N-a, R-1)(R-1)!S(N-b, C-1)(C-1)!.$$

In addition, substituting into the above, the terms inside the summation are independent of i and j and hence the summations over i and j can be removed and the whole expression multiplied by RC. Thus, $$E[\hat{I}(M);R,C]=\sum_{a=1}^{N-R+1}\sum_{b=1}^{N-C+1}\sum_{n=(a+b-N)^+}^{min(a,b)}\theta(n,a,b)\Psi(n,a,b;R,C).$$

where $$\Psi(n,a,b;R,C)=\frac{\binom{N}{a}\binom{a}{n}\binom{N-a}{b-n}S(N-a,R-1)S(N-b,C-1)}{S(N,R)S(N,C)}.$$

Once EI* has been calculated, the adjusted index can be calculated as $$AI^*=\frac{\hat{I}(M)-E[\hat{I}(M);R,C]}{\mathcal{K}},$$

where $\mathcal{K}$ is a normalization constant. Using one such choice for $\mathcal{K}$ we have $$AI^*=\frac{\hat{I}(M)-E[\hat{I}(M);R,C]}{\min(H(U),H(V))-E[\hat{I}(M);R,C]},$$

where the denominator min (H(U), H(V))−E [Î(M); R, C] is the maximum mutual information between the first and second clustering minus the expected index we get given R and C first and second clusters, respectively. In another embodiment, the adjusted index can be normalized using a divisor that may depend on the clustering results. For example, $$AI^*=\frac{\hat{I}(M)-E[\hat{I}(M);R,C]}{\mathcal{K}-E[\hat{I}(M)\mid a,b]}$$

where, for example, $\mathcal{K}$ could be the smaller of H(U) and H(V).

Figure 5D:
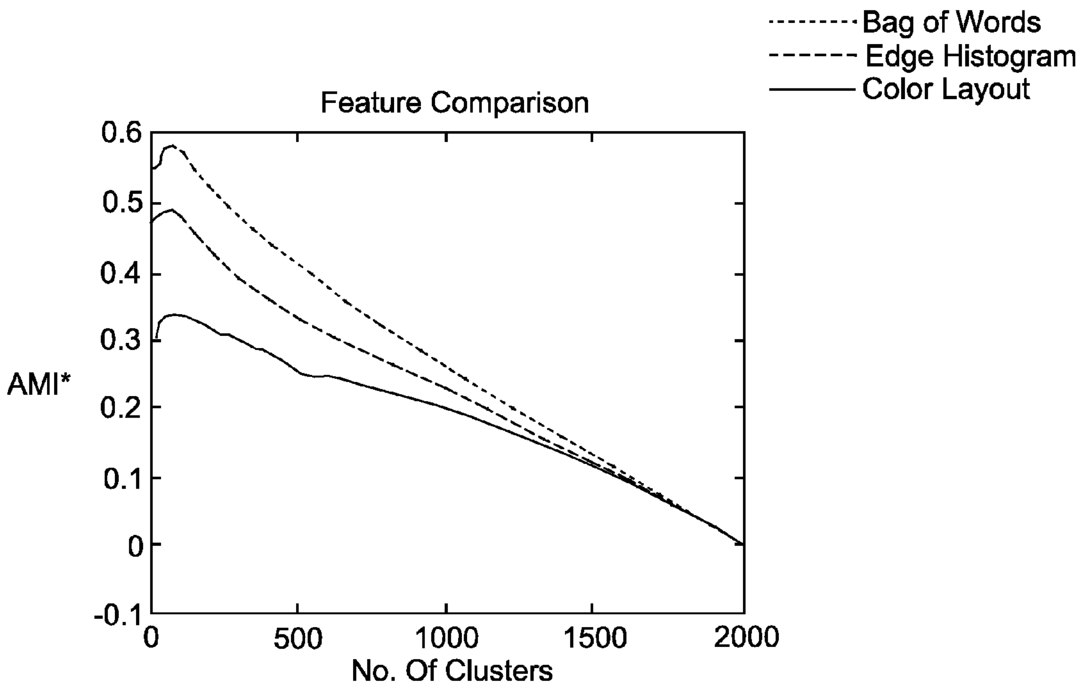
FIGS. 5D to 5F are diagrams depicting example results of clustering procedures according to an example embodiment.
Figure 5E:
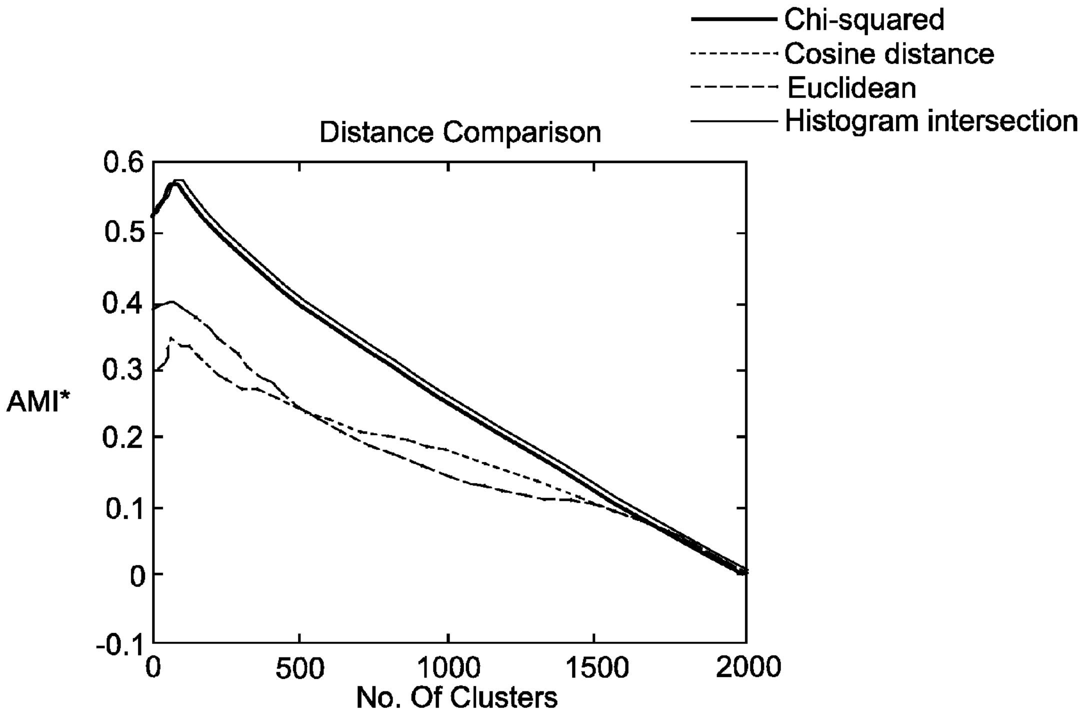
Figure 5F:
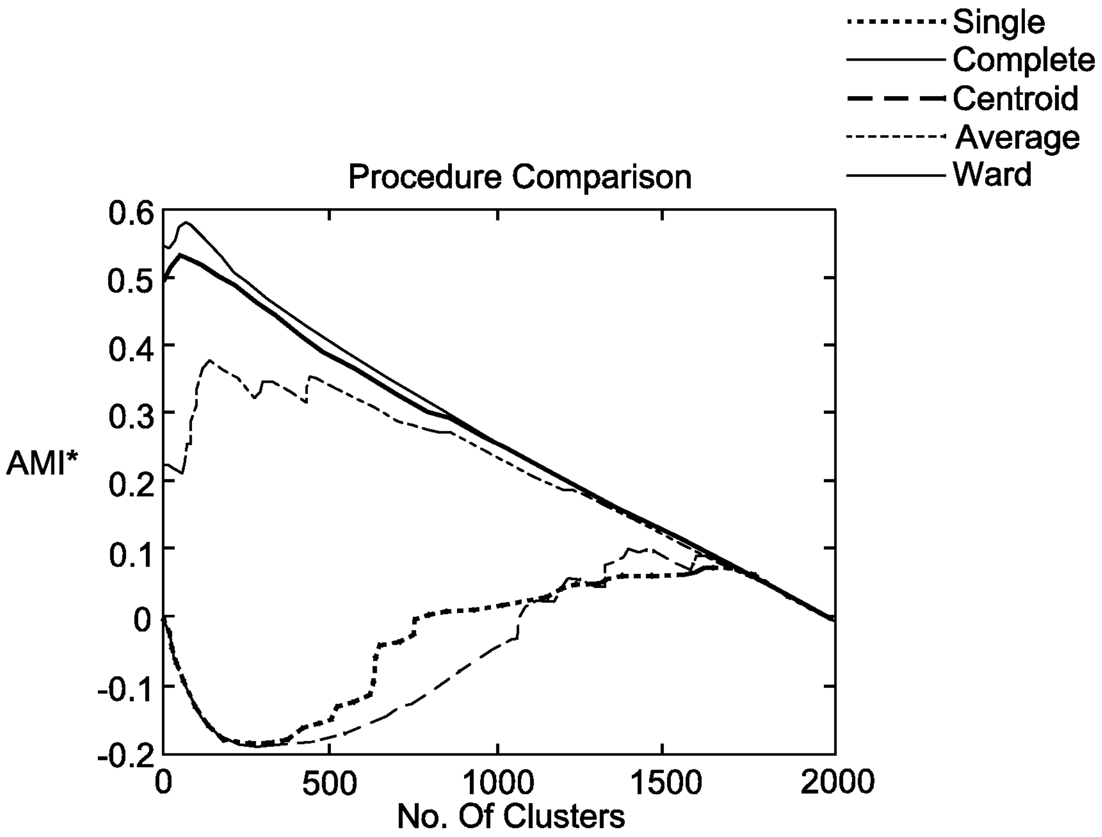

FIGS. 5D to 5F are diagrams depicting example results of clustering procedures according to an example embodiment. Specifically, FIG. 5D illustrates AI* based on different input features and clusters produced. Meanwhile, FIG. 5E illustrates AI* based on different distance comparisons and clusters produced. FIG. 5F illustrates AI* based on example clustering procedures and clusters produced.

By comparing sets of clusters produced by respective sets of clustering procedures against a predetermined categorization (which may be a set of clusters produced by another clustering procedure) of images to generate respective scores for each clustering procedure, it is ordinarily possible to automatically choose a clustering procedure which will group images in a manner best approximating a grouping performed manually by a user, as well as choose a clustering procedure for other purposes.

As mentioned above, while the above process has been described with respect to images for purposes of conciseness, it should be understood that other embodiments could also operate on other objects. For example, other embodiments could be directed to selecting a clustering procedure for clustering audio files, moving image files, documents, etc.

Figure 6:
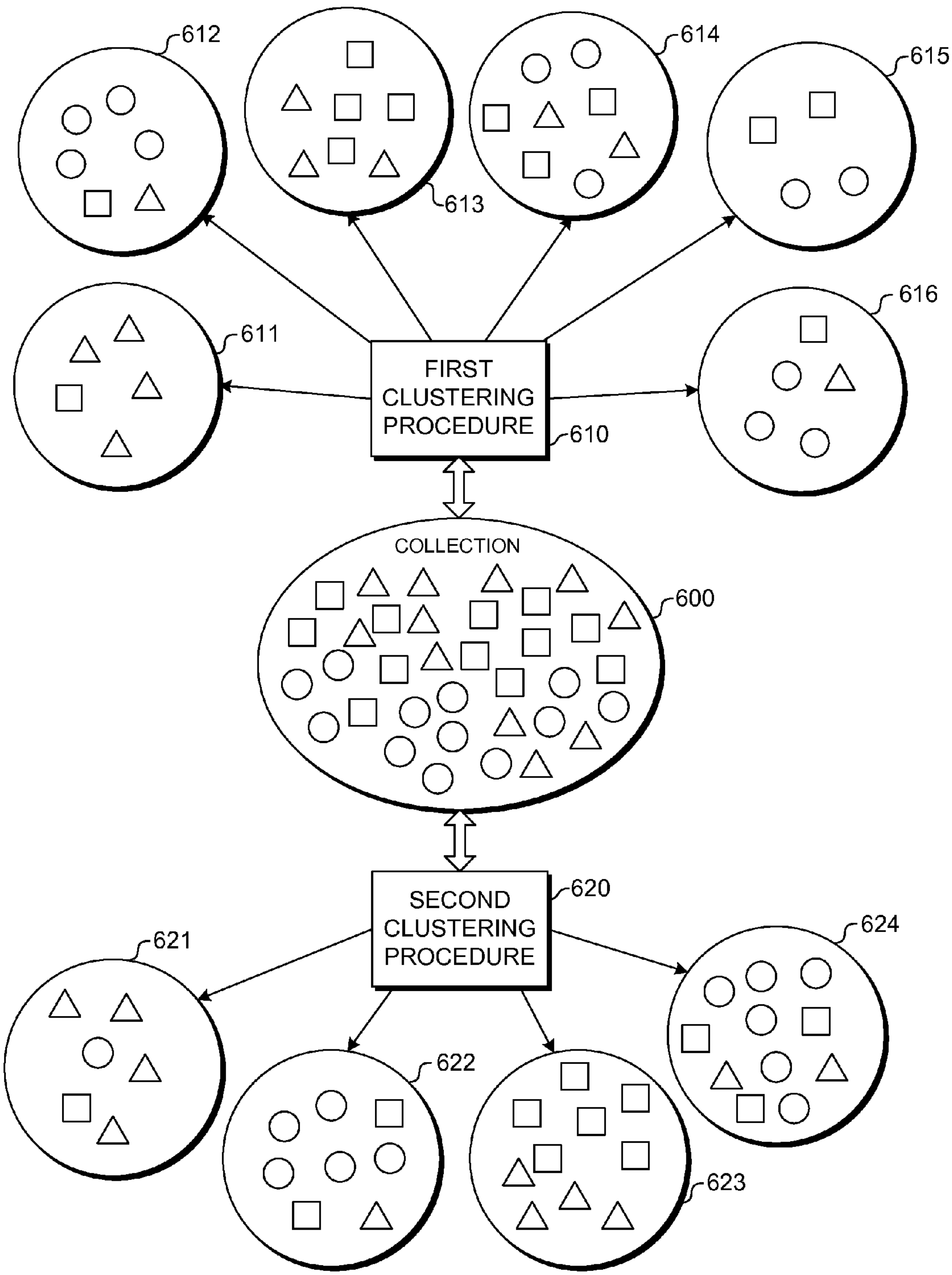
FIG. 6 is a block diagram that illustrates an example embodiment of objects in a collection that are organized into sets of clusters.

FIG. 6 is a block diagram that illustrates an example embodiment of objects that are organized into different sets of clusters. The objects in a collection 600 are organized by a first clustering procedure 610 into clusters 611, 612, 612, 614, 615, and 616. The objects in the collection 600 are also organized by a second clustering procedure 620 into clusters 621, 622, 623, and 624. Thus, clusters 611-616 may be compared with clusters 621-624 to evaluate a similarity of the first clustering procedure 610 to the second clustering procedure 620.

The number of objects and the number of clusters are shown as an example. In other embodiments the collection 600 may include more objects. Also, though the first clustering procedure 610 assigned the objects to six clusters and the second clustering procedure 620 assigned the object to four clusters, in other embodiments the objects may be assigned to more or less clusters (e.g., 2, 7, 9, 25, 34, X (where X is an arbitrary number of clusters)). The number of clusters may be constrained to be less than or equal to the total number of objects in the collection 600.

Figure 7A:
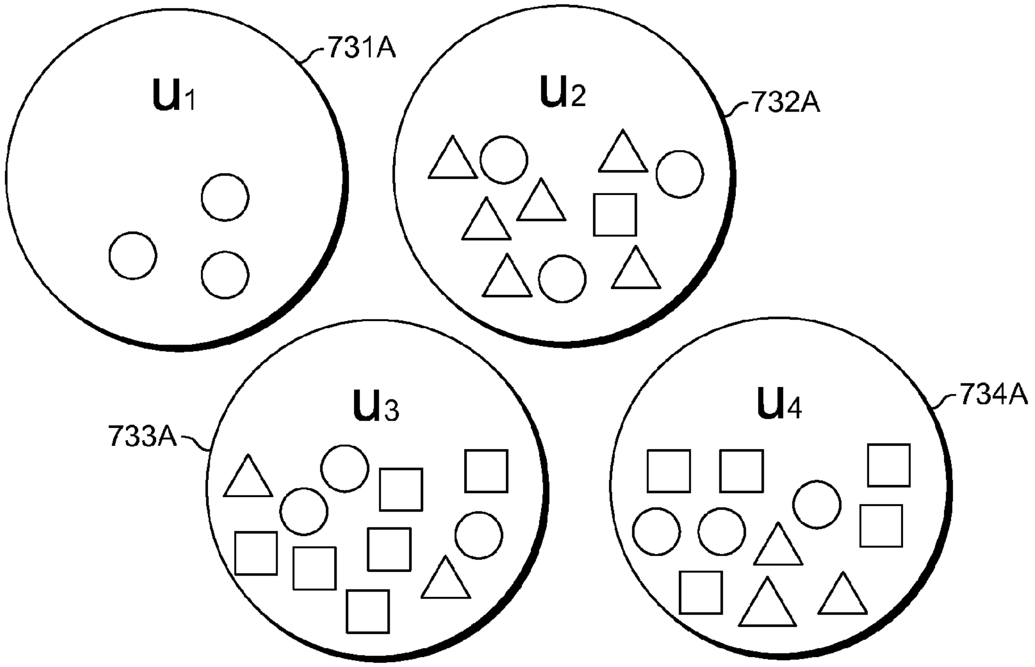
FIGS. 7A and 7B illustrate example embodiments of randomly generated sets of clusters.
Figure 7B:
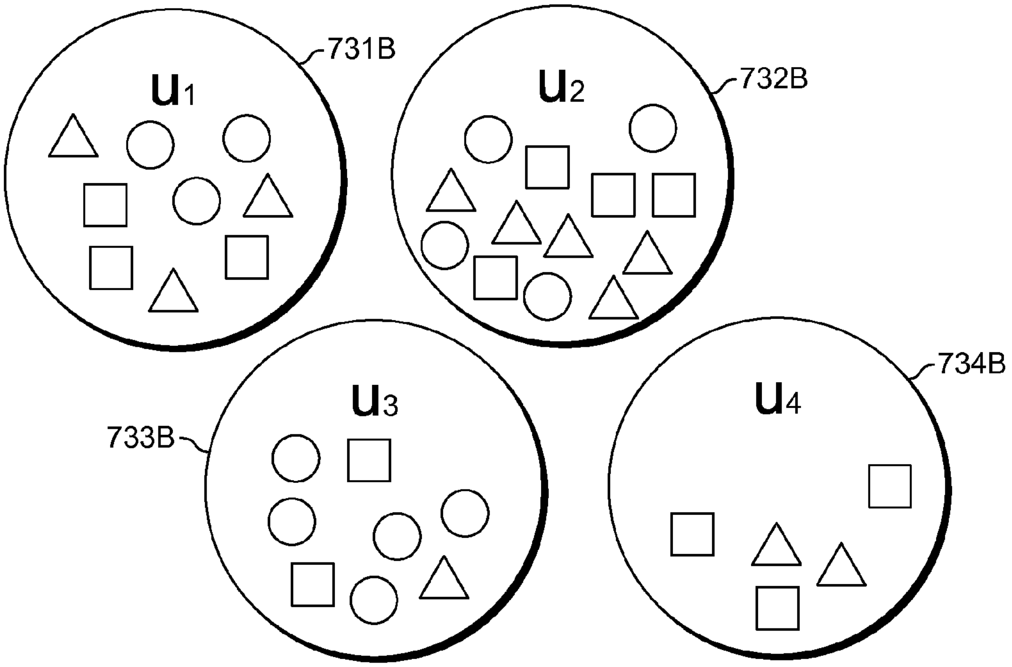

FIGS. 7A and 7B illustrate example embodiments of randomly generated sets of clusters. Randomly generated sets of clusters may be formed by assigning objects in a collection to clusters without performing any analysis (e.g., feature extraction) on the objects. FIG. 7A illustrates a set of four clusters 731A-734A that are formed by randomly assigning the objects from the collection 600 to four clusters. Cluster 731A is denoted $u_1$, cluster 732A is denoted $u_2$, cluster 733A is denoted $u_3$, and cluster 734A is denoted $u_4$. FIG. 7B also illustrates a set of four clusters 731B-734B that are formed by randomly assigning the objects from the collection 600 to four clusters. Cluster 731B is denoted $u_1$, cluster 732B is denoted $u_2$, cluster 733B is denoted $u_3$, and cluster 734B is denoted $u_4$.

Figure 8A:
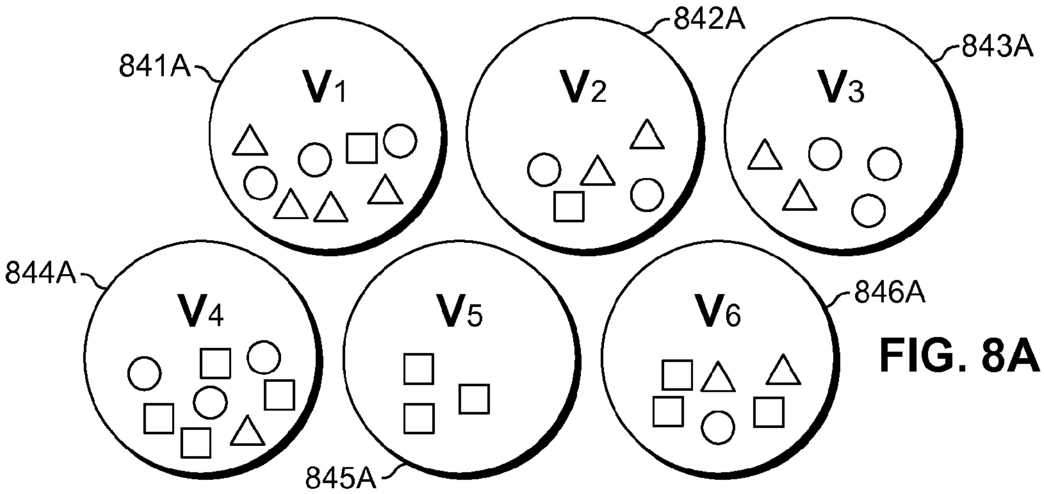
FIGS. 8A to 8C illustrate example embodiments of randomly generated sets of clusters.
Figure 8B:
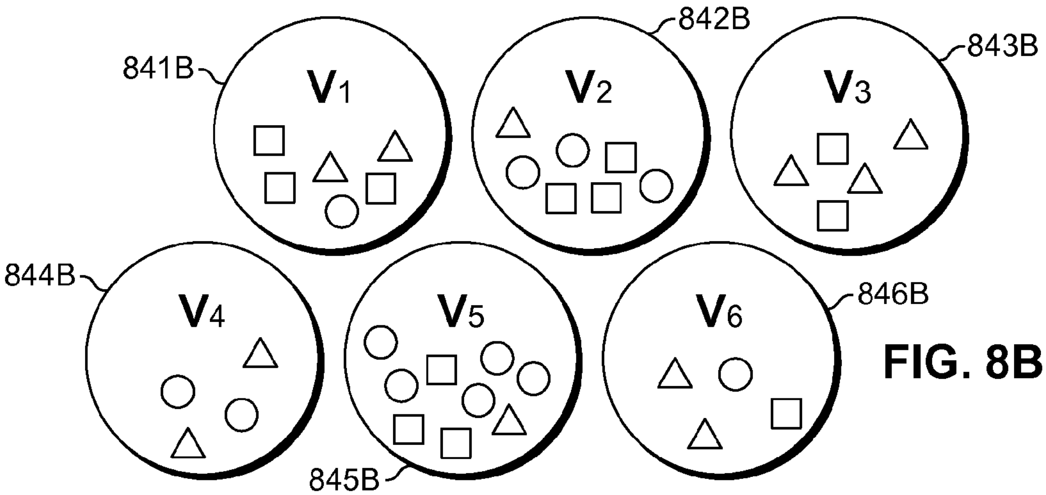
Figure 8C:
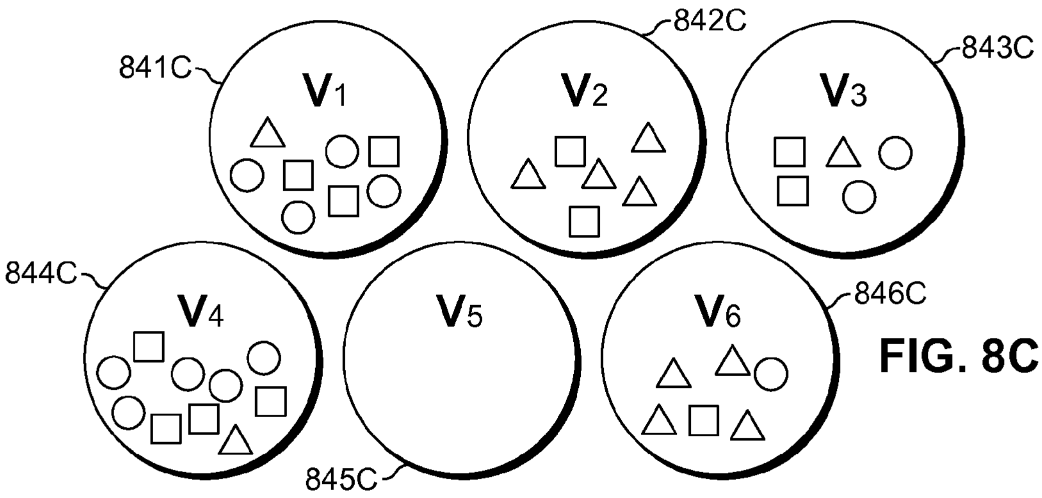

FIGS. 8A to 8C illustrate example embodiments of randomly generated sets of clusters. FIG. 8A illustrates a set of six clusters 841A-846A that are formed by randomly assigning the objects from the collection 600 to six clusters. Cluster 841A is denoted $v_1$, cluster 842A is denoted $v_2$, cluster 843A is denoted $v_3$, cluster 844A is denoted $v_4$, cluster 845A is denoted $v_5$, and cluster 846A is denoted $v_6$. FIG. 8B also illustrates a set of six clusters 841B-846B that are formed by randomly assigning the objects from the collection 600 to six clusters. Cluster 841B is denoted $v_1$, cluster 842B is denoted $v_2$, cluster 843B is denoted $v_3$, cluster 844B is denoted $v_4$, cluster 845B is denoted $v_5$, and cluster 846B is denoted $v_6$. Additionally, FIG. 8C illustrates a set of six clusters 841C-846C that are formed by randomly assigning the objects from the collection 600 to six clusters. Cluster 841C is denoted $v_1$, cluster 842C is denoted $v_2$, cluster 843C is denoted $v_3$, cluster 844C is denoted $v_4$, cluster 845C is denoted $v_5$, and cluster 846C is denoted $v_6$.

FIGS. 9A and 9B illustrate example embodiments of contingency tables. FIG. 9A shows an example embodiment of a contingency table 900A that has four rows and six columns. The marginal values 930A correspond to the number of objects in the randomly generated clusters 731A-734A in the set of clusters shown in FIG. 7A. Thus, row $u_1$ corresponds to cluster $u_1$, row $u_2$ corresponds to cluster $u_2$, etc. The column marginal values 940A are not determined.

FIG. 9B shows an example embodiment of a contingency table 900B that has four rows and six columns and that compares randomly generated clusters 731A-734A with randomly generated clusters 841A-846A. Thus, the table 900B includes four rows $u_1$-$u_4$ corresponding to the four clusters of clusters 731A-734A and includes six columns $v_1$-$v_6$ corresponding to the six clusters of clusters 841A-846A. The total number of objects, 35, equals the total number of objects in the collection 600. The row marginal totals 930B indicate the total number of objects in the respective clusters 731A-734A associated with the rows. The column marginal totals 940B indicate the total number of objects in the respective clusters 841A-846A associated with the columns.

The contingency table 900B indicates the sharing of objects between clusters 731A-734A and clusters 841A-846A, shown in FIGS. 7A and 8A. For example, cell 951B indicates that there are 2 objects shared by cluster 733A and cluster 842A. Also for example, cell 953B indicates that there are 3 objects shared by cluster 732A and cluster 844A. Therefore, though the respective clusters associated with the rows $u_1$-$u_4$ and the columns $v_1$-$v_6$ are randomly generated, the randomly generated clusters associated with the rows still share objects with the randomly generated clusters associated with the columns. Therefore, even sets of clusters formed randomly will still share objects with and have a similarity to other sets of clusters.

FIGS. 10A and 10B illustrate example embodiments of contingency tables. FIG. 10A shows an example embodiment of a contingency table 1000A that has four rows and six columns and that compares clusters 731A-734A with clusters 841B-846B. Thus, as with the other contingency tables described herein, the row marginal totals 1030A indicate the total number of objects in the cluster associated with the respective row. For example, since cluster 731A contains 3 objects, the marginal total of the row associated with cluster 731A, which is row $u_1$, is 3. Likewise, cluster 732A contains 10 objects, and the row associated with cluster 732A, which is row $u_2$, has a marginal total of 10. Also, cluster 733A contains 11 objects, and the row associated with cluster 733A, which is row $u_3$, has a marginal total of 11. Finally, cluster 734A contains 11 objects, and the row associated with cluster 734A, which is row $u_4$, has a marginal total of 11.

Furthermore, the column marginal totals 1040A indicate the total number of objects in the respective cluster associated with the column. Thus, the marginal total of column $v_1$ is 6 because 6 is the total number of objects in cluster 841B, the marginal total of column $v_2$ is 7 because 7 is the total number of objects in cluster 842B, the marginal total of column $v_3$ is 5 because 5 is the total number of objects in cluster 843B, the marginal total of column $v_4$ is 4 because 4 is the total number of objects in cluster 844B, the marginal total of column $v_5$ is 9 because 9 is the total number of objects in cluster 845B, and the marginal total of column $v_6$ is 4 because 4 is the total number of objects in cluster 846B.

The contingency table 1000A indicates the sharing of objects between 731A-734A and clusters 841B-846B. For example, cell 1051A indicates that there are 6 objects shared by cluster 733A and cluster 842B. Also for example, cell 1053A indicates that there are 3 objects shared by cluster 732A and cluster 844B.

FIG. 10B shows an example embodiment of a contingency table 1000B that indicates objects shared by clusters 731B-734B and clusters 841B-846B. Though clusters 731B-734B and clusters 841B-846B are randomly generated, the randomly generated clusters still share objects. Like FIGS. 9A, 9B, and 10A, this illustrates that even a cluster formed by a clustering procedure that randomly assigns objects to clusters will still have some similarity to other clusters, and randomly formed sets of clusters will have similarity to other sets of clusters (whether or not randomly formed). Thus, merely determining the objects shared by the clusters created by applying a clustering procedure to a collection of objects and clusters created by applying other clustering procedures to the collection of objects may not provide an accurate measure of the similarity of the clustering procedures, because any object sharing may be based on chance rather than a similarity of the clustering procedures. Rather, a baseline for the comparison is desirable in order to evaluate the performance of clustering procedures relative to one another. A baseline may be used as a point of reference to evaluate and compare clustering procedures.

Figure 11:
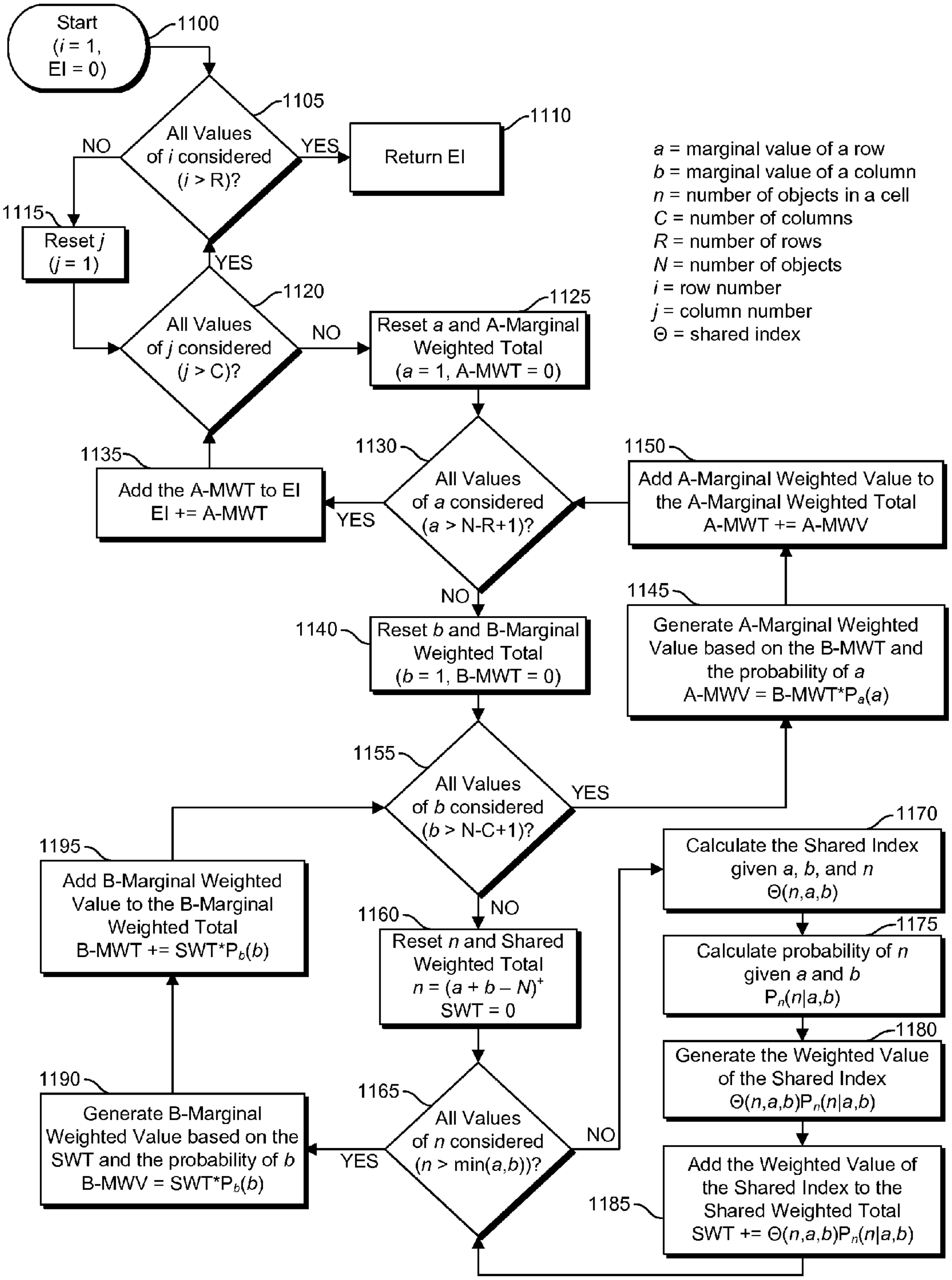
FIG. 11 is a block diagram that illustrates an example embodiment of a method for generating an expected index.

FIG. 11 is a block diagram that illustrates an example embodiment of a method for generating an expected index. An expected index (also referred to herein as "EI") may be used as a baseline when evaluating the performance of a clustering procedure. Before the flow in FIG. 11 begins, the number of clusters generated by a first clustering procedure is determined (this value is referred to as "R"). Also, the number of clustered generated by a second clustering procedure is determined (this value is referred to as "C"). Additionally, other embodiments of this method and the other methods described herein may omit blocks, add blocks, change the order of the blocks, combine blocks, and/or divide blocks into separate blocks. Additionally, one or more components of the systems and devices described herein may implement the method shown in FIG. 11 and the other methods described herein. Finally, though it may be helpful to reference a contingency table to understand the method shown in FIG. 11, generation of a contingency table is not required to perform the method. Thus, for example, a computing device performing the method would not need (though it may) to devote resources (e.g., processor time, memory) to generating and storing a contingency table.

Flow starts in block 1100, where the EI is set to 0 and a counter i is set to 1. The counter i may indicate a cluster (which may be illustrated by an associated row) formed by using a clustering procedure to cluster a collection of objects. Flow then proceeds to block 1105, where it is determined if all values of i have been considered. All values of i may be found to not have been considered if i<=R or may be found to have been considered if i>R. If in block 1105 it is determined that all values of i have been considered, then flow proceeds to block 1110, where the EI is returned. However, if R>=1, then all values of i will not have been considered the first time flow proceeds to block 1105, and thus if at least one cluster is generated using the clustering procedure then the result of the determination the first time flow proceeds to block 1105 will be "no." If in block 1105 it is determined that all values of have not been considered, then flow proceeds to block 1115.

In block 1115, the counter j, which may indicate a cluster (which may be illustrated by an associated column) formed by a clustering procedure, is reset. For example, j may be set to 1. Flow then proceeds to block 1120.

In block 1120 it is determined if all values of j have been considered. All values of j may be found to not have been considered if j<=C or may be found to have been considered if j>C. If all values of j have been considered, then flow proceeds back to block 1105. If all values of j have not been considered, then flow proceeds to block 1125. In block 1125, the counter a, which may correspond to a number of objects in a cluster (which may be illustrated by the marginal value of the associated row), is reset. For example, a may be set to 1, though in embodiments where clusters are not assumed to be non-empty a may be set to 0. Additionally, the A-Marginal Weighted Total (also referred to herein as "A-MWT"), which tracks the aggregate total of the row marginal weighted values, is set to 0.

Flow then proceeds to block 1130, where it is determined if all values of a have been considered. In some embodiments, it is assumed that no clusters are empty. Therefore, if R clusters are generated by a clustering procedure (corresponding to R rows in a contingency table), then each of the R clusters must have at least one object. Therefore, the maximum number of objects that can be in any single cluster formed by the first clustering procedure (indicated by the row marginal values) is N−R+1, and the minimum number of objects in any single cluster is 1. Accordingly, all values of a may be determined to have not been considered if a<=N−R+1, or may be determined to have been considered if a>N−R+1. If all values of a have been considered, then flow proceeds to block 1135 (described below in para. [0108]). If all values of a have not been considered, then flow proceeds to block 1140. In embodiments that allow empty clusters, block 1125 would reset a to 0 and block 1130 would consider all values of a up to and including N.

In block 1140, the counter b, which may correspond to a number of objects in a cluster (which may be illustrated by the associated column), is reset. For example, b may be set to 1, though in embodiments where clusters are not assumed to be non-empty b may be set to 0. Additionally, the B-Marginal Weighted Total (also referred to herein as "B-MWT"), which tracks the aggregate total of the column marginal weighted values, is set to 0.

Flow then proceeds to block 1155, where it is determined if all values of b have been considered. As discussed above, in some embodiments, it is assumed that no clusters are empty. Therefore, if C clusters are generated by a second clustering procedure (which may be illustrated by C columns in a contingency table), then each of the C clusters must have at least one object. Therefore, the maximum number of objects that can be in any single cluster formed by the second clustering procedure (which may be illustrated by the marginal value of the associated column) is N−C+1, and the minimum number of objects in any single cluster is 1. Accordingly, all values of b may be determined to have not been considered if b<=N−C+1, or may be determined to have been considered if b>N−C+1. In embodiments that allow empty clusters, block 1140 would reset b to 0 and block 1155 would consider all values of b up to and including N. If all values of b have been considered, then flow proceeds to block 1145 (described below in para. [0106]). If all values of b have not been considered, then flow proceeds to block 1160.

In block 1160, n, a counter associated with a number of shared objects, is reset, and the shared weighted total (also referred to herein as "SWT"), which indicates the aggregate weighted similarity index, is reset. SWT may be set to 0. For n, the minimum number of shared objects is $(a+b-N)^+$, assuming that all R clusters and all C clusters are non-empty. Thus, n may be set to $(a+b-N)^+$. Note that in some embodiments n could be set the maximum of 0 and a+b−N (which may be indicated by the notation "$(a+b-N)^{+}$"). Though in the embodiment shown in FIG. 11 the n=0 case will not have any contributive effect to SWT and may be omitted by setting n to the maximum of 1 and a+b−N, in other embodiments the n=0 case may contribute to SWT, and therefore n may be set to 0 or the maximum of 0 and a+b−N. Flow then proceeds to block 1165.

In block 1165, it is determined if all values of n given a and b have been considered. The value of n is related to a and b because the number of objects shared by two clusters may not exceed the total number of objects in either of the clusters. Thus, the maximum value of n is the minimum of a and b. Therefore, if n>min(a, b) all values of n may be determined to have been considered. Or, if n<=min(a, b), all values of n may be determined to have not been considered. If all values of n have been considered, then flow proceeds to block 1190 (discussed in para. [0104]). If all values of n have not been considered, then flow proceeds to block 1170.

In block 1170, the shared index for the given a, b, and n is calculated. θ may be used to denote a function used to calculate the shared index, thus the shared index may be denoted by θ(n, a, b). Also, in some embodiments, which calculate the shared index based on mutual information, $$\theta(n, a, b) = \frac{n}{N}\log\frac{nN}{ab}.$$

Additionally, in some embodiments, the shared index may be calculated based on the Rand index:

$$\theta(n, a, b) = \frac{\frac{N^2}{RC} - \frac{a^2}{C} - \frac{b^2}{R} + 2n^2}{N(N-1)}.$$

After the shared index is calculated, flow proceeds to block 1175.

In block 1175, the probability of n given a, b, and N is calculated. This may be denoted by $P_n(n|a, b, N)$. In some embodiments, $P_n$ is given by the density of the hypergeometric distribution. Therefore, in these embodiments, $$P_n(n \mid a, b, N) = \frac{\binom{a}{n}\binom{N-a}{b-n}}{\binom{N}{b}}.$$

Thus, $P_n$ may indicate the probability sharing n objects when a first cluster has a objects (illustrated by a marginal value of an associated row), when a second cluster has b objects (illustrated by a marginal value of an associated column), and the total number of objects in the collection is N.

Flow then proceeds to block 1180, where the weighted value of the shared index is calculated. The probability of n given a, b, and N may be used to weigh the shared index. Therefore, in some embodiments the weighted value of the shared index is $\theta(n, a, b)P_n(n|a, b, N)$. Flow then moves to block 1185.

In block 1185, the weighted value of the shared index is added to the SWT. Thus, in a particular iteration of the flow, SWT+=$\theta(n, a, b)\,P_n(n|a, b, N)$. After block 1185, n is incremented (e.g., n=n+1) and flow then proceeds back to block 1165. Thus, after all values of n are considered in block 1165, SWT=$\Sigma_n\theta(n, a, b)P_n(n|a, b, N)$.

If in block 1165 all values of n given a and b have been considered, then flow proceeds to block 1190. In block 1190, the B-Marginal Weighted Value (also referred to herein as "B-MWV") is generated based on the SWT and the probability of b, which may be denoted by $P_b(b)$. The B-Marginal Weighted Value may be generated according to B-MWV=SWT*$P_b(b)$. Depending on the embodiment, $P_b(b)$ may be generated based on b given N and C and may be denoted by $P_b(b; N, C)$. In some embodiments, $$P_b(b; N, C) = \frac{1}{C}\binom{N}{b}\frac{\left\{ {N-b \atop C-1} \right\}}{\left\{ {N \atop C} \right\}},$$

where $\left\{ {N \atop C} \right\}$ is a Stirling number of the second kind, sometimes denoted at S(N,C).

The flow then proceeds to block 1195, where the B-MWV is added to the B-MWT. Thus, for any given iteration of the flow through block 1195, B-MWT+=B-MWV. The B-MWT generated by the flow after all values of b have been considered may be given by the following equation:

$$B\text{-}MWT = \sum_{b=1}^{N-C+1} \left\{ \sum_{n=(a+b-N)^+}^{\min(a,b)} \theta(n, a, b) P_n(n \mid a, b, N) \right\} P_b(b).$$

Next, b is incremented (e.g., b=b+1) and flow returns to block 1155. If in block 1155 all values of b have been considered, then flow proceeds to block 1145. In block 1145, the A-Marginal Weighted Value (also referred to herein as "A-MWV") is generated based on the B-MWT and the probability of a, which may be denoted by $P_a(a)$. The A-MWV may be generated according to A-MWV=B-MWT*$P_a(a)$. Depending on the embodiment, $P_a(a)$ may be generated based on a given N and R and may be denoted by $P_a(a; N, R)$. In some embodiments, $$P_a(a; N, R) = \frac{1}{R} \binom{N}{a} \frac{\left\{ \begin{matrix} N-a \\ R-1 \end{matrix} \right\}}{\left\{ \begin{matrix} N \\ R \end{matrix} \right\}}.$$

The flow then proceeds to block 1150, where the A-MWV is added to the A-MWT. Thus, for any given iteration of the flow through block 1150, A-MWT+=A-MWV. The A-MWT generated by the flow after all values of a have been considered may be given by the following equation:

$$A\text{-}MWT = \sum_{a=1}^{N-R+1} \left[ \sum_{b=1}^{N-C+1} \left\{ \sum_{n=(a+b-N)^+}^{\min(a,b)} \theta(n, a, b) P_n(n \mid a, b, N) \right\} P_b(b) \right] P_a(a).$$

After block 1150, a is incremented (e.g., a=a+1) and flow returns to block 1130. If all values of a are considered in block 1130, then flow proceeds to block 1135. In block 1135, the A-MWT is added to EI. Accordingly, for any given iteration of the flow through block 1135, EI+=A-MWT. Next, j is incremented (e.g., j=j+1), and flow returns to block 1120. If all values of j have been considered, then i is incremented (e.g., i=i+1) and flow returns to 1105. If all values of i have been considered, then flow proceeds to block 1110, and the EI is returned. Therefore, after all values of i, j, a, b, and n are considered, EI may be given by the following equation:

$$EI = \sum_{i=1}^{R} \sum_{j=1}^{C} \sum_{a=1}^{N-R+1} \left[ \sum_{b=1}^{N-C+1} \left\{ \sum_{n=(a+b-N)^+}^{\min(a,b)} \theta(n, a, b) P_n(n \mid a, b, N) \right\} P_b(b) \right] P_a(a).$$

In some embodiments, which are based on mutual information, $$EI = \sum_{i=1}^{R} \sum_{j=1}^{C} \sum_{a=1}^{N-R+1} \frac{1}{R} \binom{N}{a} \frac{\left\{ \begin{matrix} N-a \\ R-1 \end{matrix} \right\}}{\left\{ \begin{matrix} N \\ R \end{matrix} \right\}} \left[ \begin{matrix} \displaystyle\sum_{b=1}^{N-C+1} \frac{1}{C} \binom{N}{b} \frac{\left\{ \begin{matrix} N-b \\ C-1 \end{matrix} \right\}}{\left\{ \begin{matrix} N \\ C \end{matrix} \right\}} \\ \left\{ \displaystyle\sum_{n=(a+b-N)^+}^{\min(a,b)} \frac{\binom{a}{n}\binom{N-a}{b-n}}{\binom{N}{b}} \frac{n}{N} \log \frac{nN}{ab} \right\} \end{matrix} \right].$$

Also, in some embodiments, which are based on the Rand index, $$EI = \left( 1 - \frac{\left\{ \begin{matrix} N-1 \\ R \end{matrix} \right\}}{\left\{ \begin{matrix} N \\ R \end{matrix} \right\}} \right) \left( 1 - \frac{\left\{ \begin{matrix} N-1 \\ C \end{matrix} \right\}}{\left\{ \begin{matrix} N \\ C \end{matrix} \right\}} \right) + \frac{\left\{ \begin{matrix} N-1 \\ R \end{matrix} \right\}}{\left\{ \begin{matrix} N \\ R \end{matrix} \right\}} \frac{\left\{ \begin{matrix} N-1 \\ C \end{matrix} \right\}}{\left\{ \begin{matrix} N \\ C \end{matrix} \right\}}.$$

Figure 12:
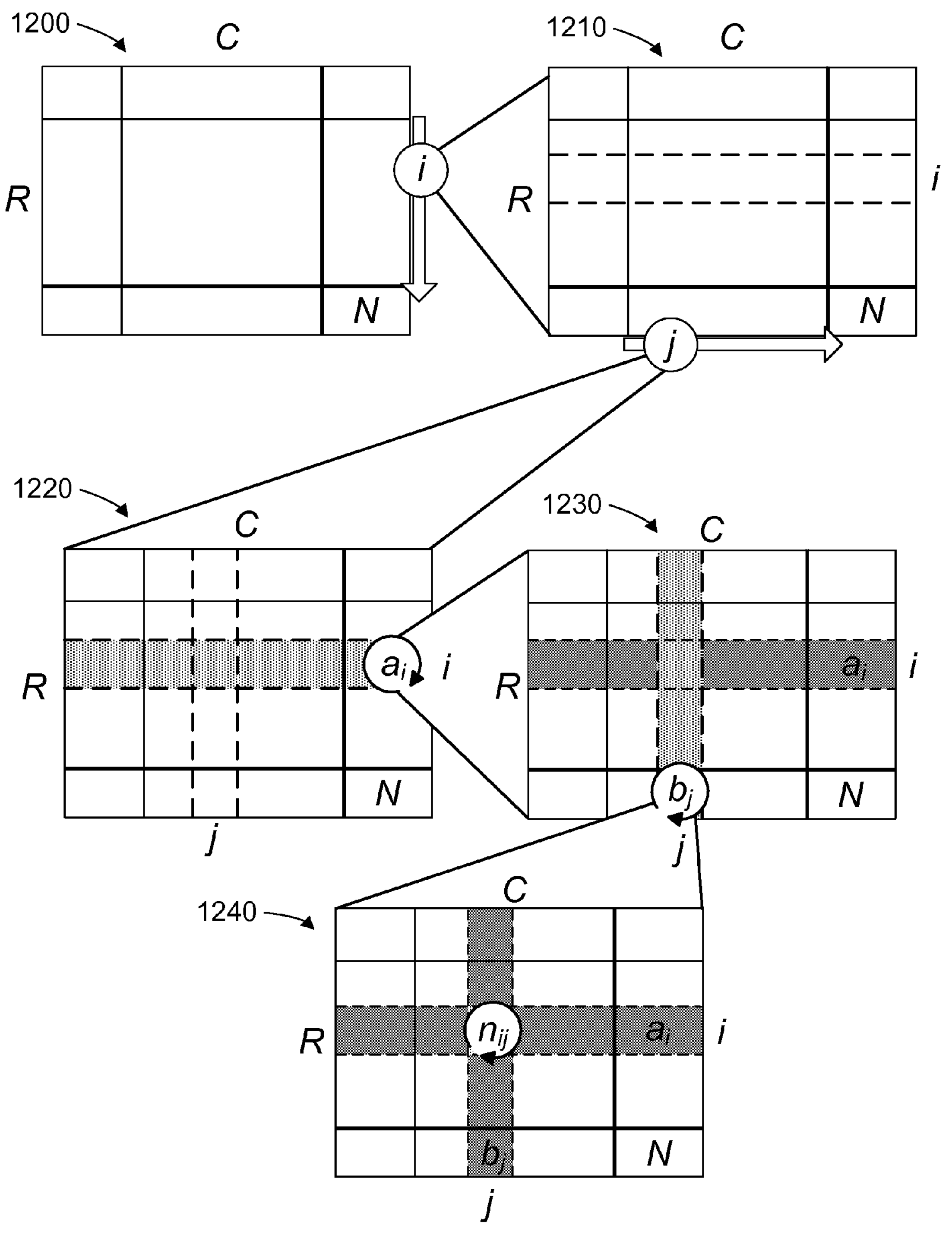
FIG. 12 illustrates an order of operations used to generate the expected index for two sets of clusters.

FIG. 12 illustrates a flow used to evaluate the expected index between two sets of clusters. FIG. 12 illustrates this flow by referencing a contingency table. First, as is shown in table 1200, flow proceeds row by row. A specific row being evaluated is denoted by i. For each row i, flow proceeds across all columns, column by column, as is shown in table 1210. A specific column being evaluated is denoted by j. In other embodiments, flow may first proceed column by column then row by row.

Within row i all row marginal values (denoted by $a_i$) are considered, as is shown in table 1220. For each $a_i$ all column marginal values, denoted by $b_j$, are considered, as is shown in table 1230. Finally, for each marginal value $b_j$ and the $a_i$ being considered, for all cell values for $n_{ij}$ a weighted value of the shared index is calculated. Thus, the flow systematically calculates the weighted value of the shared index for all values of a cell given all marginal values of a column, for all marginal values of a column given a row marginal value, for all columns of a table, and for all rows of a table. In other embodiments, flow may first proceed in a different order.

Figure 13:
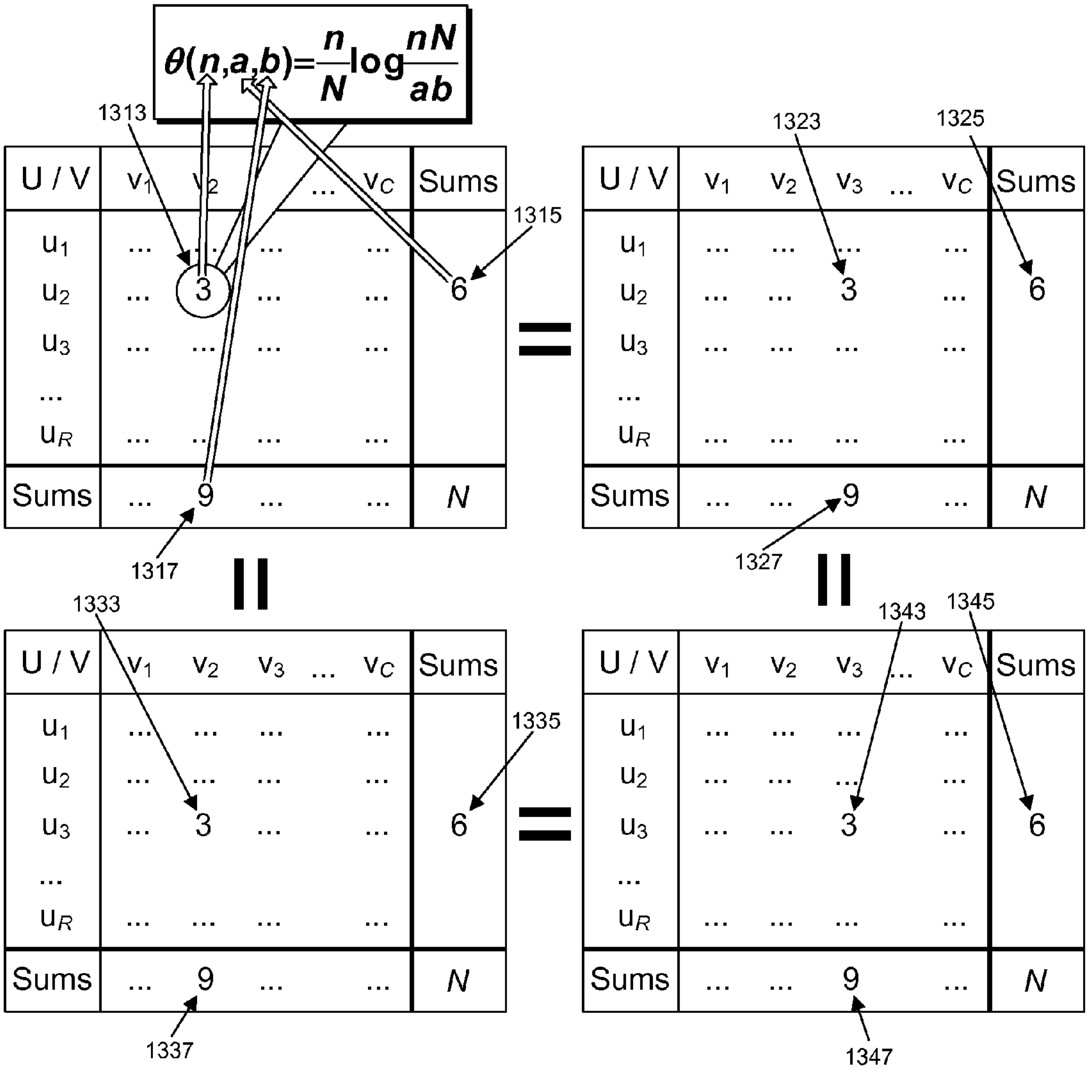
FIG. 13 illustrates example embodiments of contingency tables that show the independence of a shared index from the column number and the row number.

FIG. 13 illustrates example embodiments of contingency tables that show the independence of the row number and the column number from a shared index. In one embodiment, the shared index θ for n objects is $$\theta(n, a, b) = \frac{n}{N} \log \frac{nN}{ab}.$$

However, the shared index may be generated in other ways, for example by $$\theta(n, a, b) = \frac{\frac{N^2}{RC} - \frac{a^2}{C} - \frac{b^2}{R} + 2n^2}{N(N-1)}.$$

Therefore, the shared index depends on the number of shared objects n, the row marginal value 1315, and the column marginal value 1317. However, the shared index given particular values of n, a, and b is not dependent on the column number j or row number i. Therefore, the shared index of cell 1313 is the same as the shared index of cell 1323, even though cell 1313 is in column $v_2$ and cell 1323 is in column $v_3$, because the row marginal value 1325 and the column marginal value 1327 of cell 1323 are the same as the row marginal value 1315 and the column marginal value 1317 of cell 1313, respectively. Likewise, though cell 1333 is in column $v_2$ and in row $u_3$ and cell 1343 is in column $v_3$ and in row $u_3$, both cells have the same shared index as cell 1313 and cell 1323 because the row marginal values 1335, 1345 and the column marginal values 1337, 1347 are the same as row marginal values 1315, 1325 and column marginal values 1317, 1327, respectively.

Not only is the shared index independent of the column number and the row number, but columns $v_1$-$v_C$ have the same range of marginal values b, since b lies within the range of 1 and N−C+1 for each column. Likewise, rows $u_1$-$u_R$ have the same range of marginal values a, since a lies within the range of 1 and N−R+1 for each row. Thus, since the shared index does not depend on column number j or row number i, the range of column marginal values b given N and C is the same for all columns, and the range of row marginal values a given N and R is the same for all rows, calculating the shared index for all the cells in a row (the number of cells in a row is C) for all rows (the number of rows is R) for all values of b given N and C for all values of a given N and R duplicates the calculation C×R times. Thus, for a given n, a, and b the shared index needs to be calculated only once.

However, the probability of a column marginal value b having a given value is relevant to the weighted value of the shared index for a cell. But the probability of b given N and C (denoted by $P_b$(b; N, C)) does not depend on the column number and, hence, is the same for each column. Therefore, when calculating the probability of a given value of b, it is only necessary to calculate the probability that any column marginal value has the given value of b. Thus, it is not necessary to calculate a probability of b for each value of b in each column (e.g., calculate $P_b(b_j; N, C)$ for j from 1 to C) if the probability of that any column has the marginal value of b given N and C is known. In some embodiments, the probability that any one column has the marginal value of b given N and C is given by the following distribution (also referred to herein as the "Stirling distribution" since it includes Stirling numbers of the second kind or as the "cluster cardinality distribution"):

$$P_b(b; N, C) = \frac{1}{C}\binom{N}{b}\frac{\left\{ N-b \atop C-1 \right\}}{\left\{ N \atop C \right\}}.$$

Thus, when the distribution $P_b$ is summed for all columns C we are given the sum $$S_b(b) = \sum_{j=1}^{C} \frac{1}{C}\binom{N}{b}\frac{\left\{ N-b \atop C-1 \right\}}{\left\{ N \atop C \right\}} = \binom{N}{b}\frac{\left\{ N-b \atop C-1 \right\}}{\left\{ N \atop C \right\}}.$$

Therefore, since the shared index, $P_n$, and $S_b$ do not depend on j, the above sum of $S_b$ can be substituted for $\Sigma_{j=1}^{C} P_b$(b; N, C) and the summation over j can be removed from the equation $$EI = \sum_{i=1}^{R}\sum_{j=1}^{C}\sum_{a=1}^{N-R+1}\left[\sum_{b=1}^{N-C+1}\left\{\sum_{n=(a+b-N)^+}^{min(a,b)} \theta(n, a, b)P_n(n \mid a, b, N)\right\}P_b(b)\right]P_a(a),$$

which yields $$EI = \sum_{i=1}^{R}\sum_{a=1}^{N-R+1}\left[\sum_{b=1}^{N-C+1}\left\{\sum_{n=(a+b-N)^+}^{min(a,b)} \theta(n, a, b)P_n(n \mid a, b, N)\right\}\binom{N}{b}\frac{\left\{ N-b \atop C-1 \right\}}{\left\{ N \atop C \right\}}\right]P_a(a).$$

However, in embodiments where $$P_n(n \mid a, b, N) = \frac{\binom{a}{n}\binom{N-a}{b-n}}{\binom{N}{b}},$$

then $$EI = \sum_{i=1}^{R}\sum_{a=1}^{N-R+1}\left[\sum_{b=1}^{N-C+1}\left\{\sum_{n=(a+b-N)^+}^{min(a,b)} \theta(n, a, b)\frac{\binom{a}{n}\binom{N-a}{b-n}}{\binom{N}{b}}\right\}\binom{N}{b}\frac{\left\{ N-b \atop C-1 \right\}}{\left\{ N \atop C \right\}}\right]P_a(a).$$

This may be simplified to $$EI = \sum_{i=1}^{R} \sum_{a=1}^{N-R+1} \left[ \sum_{b=1}^{N-C+1} \sum_{n=(a+b-N)^+}^{min(a,b)} \theta(n, a, b) \frac{\binom{a}{n}\binom{N-a}{b-n}\left\{ {N-b \atop C-1} \right\}}{\left\{ {N \atop C} \right\}} \right] P_a(a).$$

Likewise, the probability of a given N and R (denoted by $P_a$(a; N, R)) is the same for each row and hence does not depend on the row number. Therefore, when calculating the probability of a given value of a, it is only necessary to calculate the probability that any row marginal value has the given value of a. In some embodiments, the probability that any one row has the marginal value of a given N and R is given by the Stirling distribution:

$$P_a(a; N, R) = \frac{1}{R} \binom{N}{a} \frac{\left\{ {N-a \atop R-1} \right\}}{\left\{ {N \atop R} \right\}}.$$

Thus, when the distribution $P_a$ is summed for all rows R we are given the sum $$S_a(a) = \sum_{i=1}^{R} \frac{1}{R} \binom{N}{a} \frac{\left\{ {N-a \atop R-1} \right\}}{\left\{ {N \atop R} \right\}} = \binom{N}{a} \frac{\left\{ {N-a \atop R-1} \right\}}{\left\{ {N \atop R} \right\}}.$$

Therefore, since the shared index, $P_n$, and $S_a$ do not depend on i, the above sum of $S_a$ can be substituted for $\Sigma_{i=1}^{R} P_a$ (a; N, R) and the summation over i can be removed from the equation $$EI = \sum_{i=1}^{R} \sum_{a=1}^{N-R+1} \left[ \sum_{b=1}^{N-C+1} \sum_{n=(a+b-N)^+}^{min(a,b)} \theta(n, a, b) \frac{\binom{a}{n}\binom{N-a}{b-n}\left\{ {N-b \atop C-1} \right\}}{\left\{ {N \atop C} \right\}} \right] P_a(a),$$

which yields $$EI = \sum_{a=1}^{N-R+1} \left[ \sum_{b=1}^{N-C+1} \sum_{n=(a+b-N)^+}^{min(a,b)} \theta(n, a, b) \frac{\binom{a}{n}\binom{N-a}{b-n}\left\{ {N-b \atop C-1} \right\}}{\left\{ {N \atop C} \right\}} \right] \binom{N}{a} \frac{\left\{ {N-a \atop R-1} \right\}}{\left\{ {N \atop R} \right\}}.$$

Additionally, the terms in the denominators of the above expressions also do not depend on the values of a, b, or n. Thus they only need to be calculated once and may be divided at any stage of the process.

Therefore, these simplifications may be used to calculate the EI.

Figure 14:
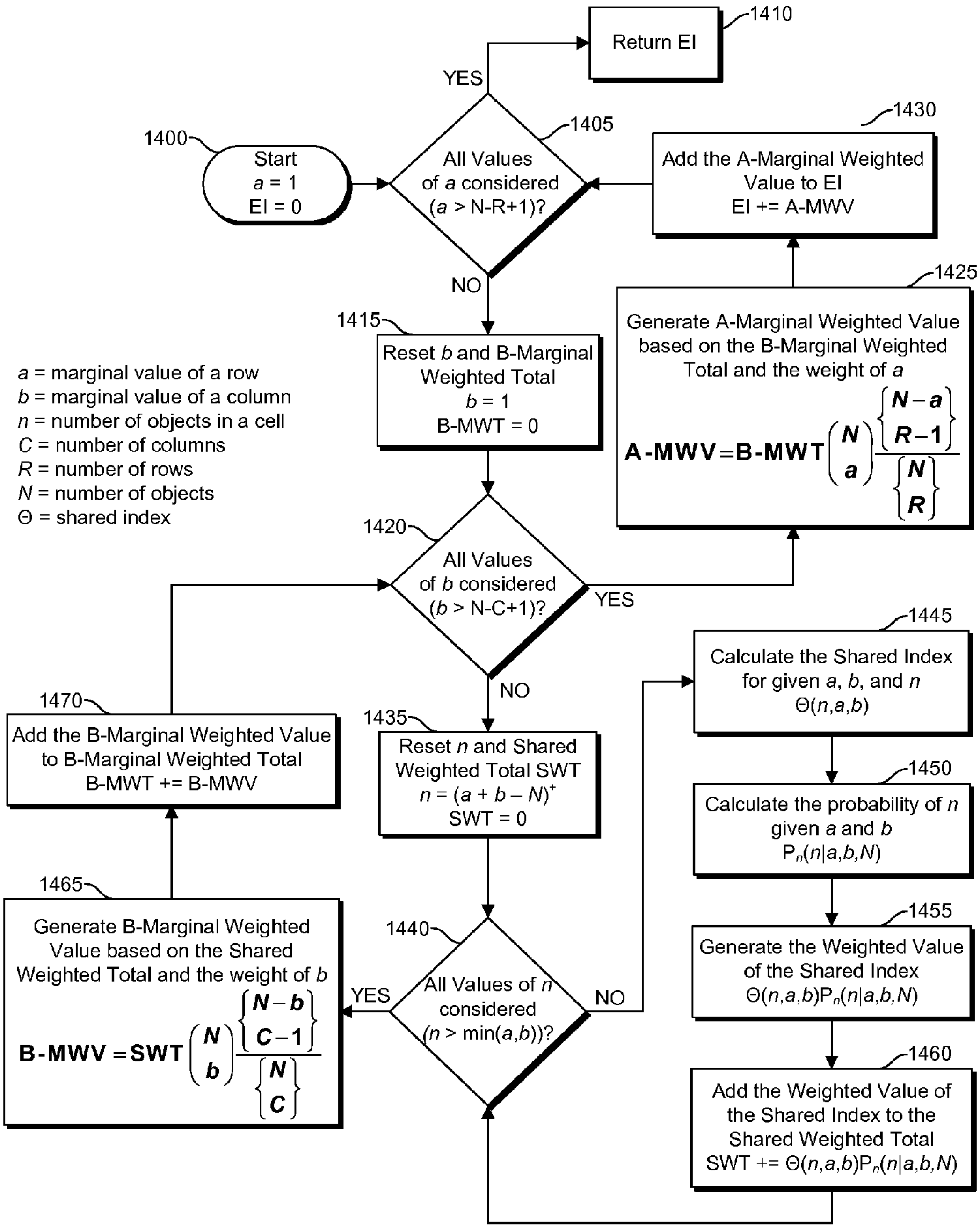
FIG. 14 is a block diagram that illustrates an example embodiment of a method for generating an expected index.

FIG. 14 is a block diagram that illustrates an example embodiment of a method for generating an expected index. Before the flow in FIG. 14 begins, the number of clusters generated by a first clustering procedure is determined (this value is referred to as "R"). Also, the number of clustered generated by a second clustering procedure is determined (this value is referred to as "C"). Additionally, other embodiments of this method may omit blocks, add blocks, change the order of the blocks, combine blocks, and/or divide blocks into separate blocks. Additionally, one or more components of the systems and devices described herein may implement the method shown in FIG. 14. Finally, though it may be helpful to reference a contingency table to understand the method shown in FIG. 14, generation of a contingency table is not required to perform the method. Thus, for example, a computing device performing the method would not need (though it may) to devote resources (e.g., processor time, memory) to generating and storing a contingency table.

Flow starts in block 1400, where the EI is set to 0 and a counter a is set to 1, though in some embodiments a may be set to 0. The counter a may correspond to a number of objects in a cluster (which may be illustrated by an associated row marginal value). Flow then proceeds to block 1405, where it is determined if all values of a have been considered. In embodiments where it is assumed that no clusters are empty, each of the R clusters must have at least one object. Therefore, the maximum number of objects that can be in any single cluster formed by the first clustering procedure is N−R+1, and the minimum number of objects in any single cluster is 1. Accordingly, all values of a may be determined to have not been considered if a<=N−R+1, or may be determined to have been considered if a>N−R+1. If in block 1405 it is determined that all values of a have been considered, then flow proceeds to block 1410, where the EI is returned. However, if N−R+1>=1, then all values of a will not have been considered the first time flow proceeds to block 1405, and the result of the determination the first time flow proceeds to block 1405 will be "no." If in block 1405 is determined that all values of a have not been considered, then flow proceeds to block 1415. In embodiments that allow empty clusters, at the start a would be set to 0 and in block 1405 all values of a up to and including N would be considered.

In block 1415, the counter b, which may correspond to a number of objects in a cluster (which may be illustrated by the associated column marginal value), is reset. For example, b may be set to 1. However, in some embodiments b may be 0. Also, the B-MWT is reset to 0.

Flow then proceeds to block 1420, where it is determined if all values of b have been considered. In embodiments where it is assumed that no clusters are empty, each of the C clusters must have at least one object. Therefore, the maximum number of objects that can be in any single cluster formed by the second clustering procedure is N−C+1, and the minimum number of objects in any single cluster is 1. Accordingly, all values of b may be determined to have not been considered if b<=N−C+1, or may be determined to have been considered if b>N−C+1. If all values of b have been considered, then flow proceeds to block 1425 (discussed in para. [0129]). If all values of b have not been considered, then flow proceeds to block 1435. In embodiments that allow empty clusters, in block 1415 *b* would be set to 0 and in block 1420 all values of b up to and including N would be considered.

In block 1435, n, a counter associated with a number of shared objects, is reset, and the shared weighted total (also referred to herein as "SWT"), which indicates the aggregate weighted shared index, is reset. SWT may be set to 0. For n, the minimum number of objects in a cell is the maximum of 0 and a+b−N. Thus, n may be set to the maximum 0 and a+b−N. Flow then proceeds to block 1440. Note that in some embodiments n could be set to the maximum of 1 and a+b−N.

In block 1440, it is determined if all values of n given a and b have been considered. The value of n is related to a and b because the number of objects shared by two clusters cannot exceed the total number of objects in either of the clusters. Thus, the maximum value of n is the minimum of a and b. Therefore, if n>min(a, b) all values of n may be determined to have been considered. Or, if n<=min(a, b), all values of n may be determined to have not been considered. If all values of n have been considered, then flow proceeds to block 1465 (discussed in para. [0127]). If all values of n have not been considered, then flow proceeds to block 1445.

In block 1445, the shared index given a, b, and n is calculated, denoted by θ(n, a, b). After the shared index is calculated, flow proceeds to block 1450. In block 1450, the probability of n given a, b, and N is calculated. As discussed above, this may be denoted by $P_n$(n|a, b, N).

Flow then proceeds to block 1455, where the weighted value of the shared index is calculated. The probability of n given a, b, and N may be used to weigh the shared index θ. Therefore, in some embodiments the weighted value of the shared index is θ(n, a, b) $P_n$(n|a, b, N). Flow then moves to block 1460.

In block 1460, the weighted value of the shared index is added to the SWT. Thus, in a particular iteration of the flow, SWT+=θ(n, a, b)$P_n$(n|a, b, N). After block 1460, n is incremented (e.g., n=n+1) and flow then proceeds back to block 1440. Therefore, after all values of n are considered in block 1440, SWT=$\Sigma_n$θ(n, a, b)$P_n$(n|a, b, N).

If in block 1440 all values of n given a and b are found to have been considered, flow proceeds to block 1465. In block 1465, the B-MWV is generated based on the SWT and the sum over all columns of the probability of a column marginal value of b, which may be denoted by $S_b$(b). The marginal weighted value may be generated according to B-MWV=SWT*$S_b$(b). In some embodiments, $$S_b(b) = \binom{N}{b}\frac{\left\{ {N-b \atop C-1} \right\}}{\left\{ {N \atop C} \right\}}.$$

Because $P_n$ will eventually multiplied by $S_b$, in block 1450 $P_n$ may be calculated according to $$P_n^*(n \mid a, b, N) = \binom{a}{n}\binom{N-a}{b-n},$$

and in block 1465 the weight of b, $P_b$, may be calculated according to $$P_b^*(b) = \frac{\left\{ {N-b \atop C-1} \right\}}{\left\{ {N \atop C} \right\}}.$$

The flow then proceeds to block 1470, where the B-MWV is added to the B-MWT. Thus, for any given iteration of the flow through block 1470, B-MWT+=B-MWV. Next, b is incremented (e.g., b=b+1) and flow returns to block 1420. If all values of b are found to have been considered in block 1420, then flow proceeds to block 1425.

In block 1425, the A-MWV is generated based on the B-MWT and the sum over all rows of the probability of a row marginal value of a, which may be denoted by $S_a$(a). The marginal weighted value may be generated according to A-MWV=B-MWV*$S_a$ (a). In some embodiments, $$S_a(a) = \binom{N}{a}\frac{\left\{ {N-a \atop R-1} \right\}}{\left\{ {N \atop R} \right\}}.$$

The flow then proceeds to block 1430, where the A-MWV is added to the EI. Thus, for any given iteration of the flow through block 1430, EI+=A-MWV. Next, a is incremented (e.g., a=a+1) and flow returns to block 1405. If all values of a are found to have been considered in block 1405, then flow proceeds to block 1410, where the EI is returned. The EI generated by the flow after all values of a, b, and n have been considered may be given by the following equation:

$$EI = \sum_{a=1}^{N-R+1}\left[\sum_{b=1}^{N-C+1}\sum_{n=(a+b-N)^+}^{min(a,b)}\theta(n, a, b)\frac{\binom{a}{n}\binom{N-a}{b-n}\left\{ {N-b \atop R-1} \right\}}{\left\{ {N \atop C} \right\}}\right]\binom{N}{a}\frac{\left\{ {N-a \atop R-1} \right\}}{\left\{ {N \atop R} \right\}}.$$

However, calculating a Stirling number of the second kind can be computationally expensive, but approximations may be used which avoid the calculation of Stirling numbers. For example, when n is large, the following approximation may be used:

$$\left\{ {n \atop k} \right\} \approx \frac{k^n}{k!} \text{ as } n \to \infty.$$

Other approximations exist, such as Temme's approximation, for example. The practical computation of products and ratios of Stirling numbers and factorials may also be accomplished through computations involving sums of logarithms of Stirling numbers and factorials (i.e. Gamma functions).

Using the approximation given above for large n, the probability mass function of the cluster cardinality distribution approaches that of the binomial distribution. For example, $$P_b(b \mid N, C) = \frac{1}{C}\binom{N}{b}\frac{\left\{ {N-b \atop C-1} \right\}}{\left\{ {N \atop C} \right\}} \approx \binom{N}{b}\left(\frac{1}{C}\right)^b\left(1-\frac{1}{C}\right)^{N-b}.$$

Likewise, $$P_a(a \mid N, R) = \frac{1}{R}\binom{N}{a}\frac{\left\{ {N-a \atop R-1} \right\}}{\left\{ {N \atop R} \right\}} \approx \binom{N}{a}\left(\frac{1}{R}\right)^a\left(1-\frac{1}{R}\right)^{N-a}.$$

Moreover, the approximations of $P_b$(b|N, C) and $P_a$(a|N, R) allow empty clusters. Thus, embodiments that use one or more of the approximations are examples of embodiments that allow empty clusters, and in these embodiments the resulting EI may not be an approximation or the resulting EI may only be an approximation if all clusters are constrained to be non-empty. Additionally, for cases when N is much larger than C, the empty cluster case has a very small probability of occurring randomly, i.e., P(0) is close to zero as is P(b|N,C) for b>N−C+1 and as is P(a|N,R) for a>N−R+1, and thus the b=0, a=0, b>N−C+1, and a>N−R+1 cases can sometimes be effectively ignored.

Using this approximation, in some embodiments EI may be calculated as follows:

$$EI = RC\sum_{a=1}^{N-R+1}\sum_{b=1}^{N-C+1}\left\{\binom{N}{a}\left(\frac{1}{R}\right)^{a}\left(1-\frac{1}{R}\right)^{N-a}\binom{N}{b}\left(\frac{1}{C}\right)^{b}\left(1-\frac{1}{C}\right)^{N-b}\sum_{n=(a+b-N)^{+}}^{min(a,b)}\frac{\binom{b}{n}\binom{N-b}{a-n}}{\binom{N}{a}}\frac{n}{N}\log\frac{nN}{ab}\right\}$$

which can also be simplified by removing some ratios of common terms in the expression such as $$\binom{N}{a}$$

for example.

Since these embodiments are based on mutual information, the expected index may be referred to as "Expected Mutual Information," or "EMI."

This may be further simplified to $$EMI(R, C) = \sum_{a=a_0}^{A}\sum_{b=b_0}^{B}\binom{N}{b}\frac{(R-1)^{N-a}}{R^{N-1}}\frac{(C-1)^{N-b}}{C^{N-1}}\sum_{n=(a+b-N)^{+}}^{min(a,b)}\binom{b}{n}\binom{N-b}{a-n}\frac{n}{N}\log\frac{nN}{ab}.$$

In some embodiments, $a_0=0$, A=N, $b_0=0$, and B=N. In these embodiments, this equation may not be an approximation as it may account for empty clusters. In some embodiments, $a_0 1$, A=N−R+1, $b_0=1$, and B=N−R+1, and in these embodiments, this equation approximates the use of the Stirling distribution.

Additionally, in some embodiments the EI may be calculated as follows:

$$EI = \frac{(C-1)(R-1)+1}{RC}.$$

Since these embodiments are based on the Rand index, the expected index may be referred to as "Expected Rand Index," or "ERI."

Figure 15:
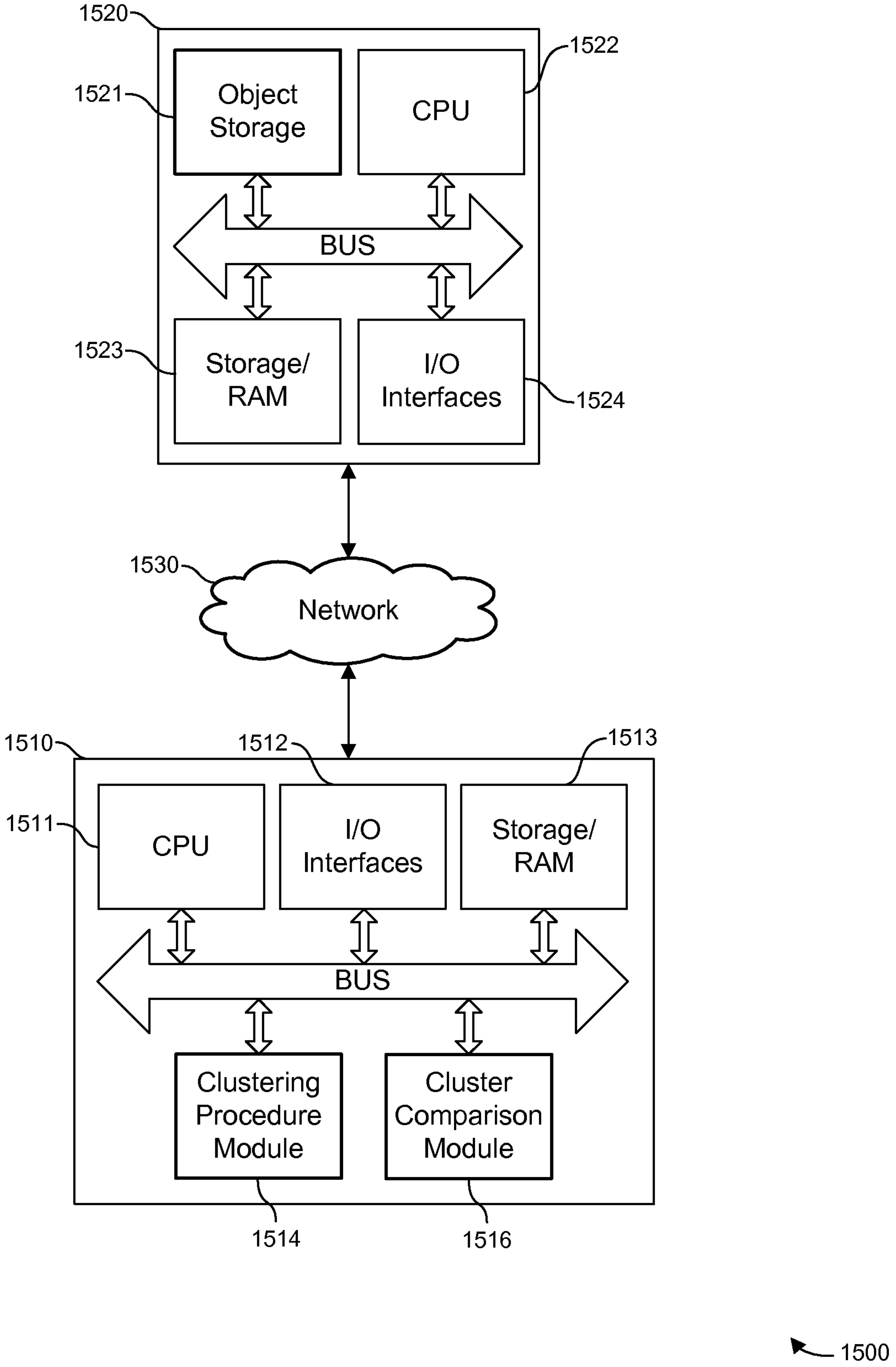
FIG. 15 is a block diagram that illustrates an example embodiment of a system for comparing object clusters.

FIG. 15 is a block diagram that illustrates an example embodiment of a system 1500 for comparing object clusters. The system includes a cluster comparison device 1510 and an object storage device 1520, both of which are computing devices (e.g., a desktop computer, a server, a PDA, a laptop, a tablet, a phone). The cluster comparison device includes one or more processors (CPUs) 1511, I/O interfaces 1512, and storage 1513. The CPUs 1511 includes one or more central processing units (e.g., microprocessors) and are configured to read and perform computer-executable instructions, such as instructions stored in the modules. Note that the computer-executable instructions may include those for the performance of various methods described herein. The I/O interfaces 1512 provide communication interfaces to input and output devices, which may include a keyboard, a display (e.g., the image repository 250), a mouse, a printing device, a touch screen, a light pen, an optical storage device, a scanner, a microphone, a camera, a drive, and a network (either wired or wireless).

Storage/RAM 1513 includes one or more computer readable and/or writable media, and may include, for example, a magnetic disk (e.g., a floppy disk, a hard disk), an optical disc (e.g., a CD, a DVD, a Blu-ray), a magneto-optical disk, a magnetic tape, semiconductor memory (e.g., a non-volatile memory card, flash memory, a solid state drive, SRAM, DRAM), an EPROM, an EEPROM, etc. Storage/RAM 1513 may store computer-readable data and/or instructions. The members of the cluster comparison device 1510 communicate via a bus.

The cluster comparison device 1510 also includes a clustering procedure module 1514 and a cluster comparison module 1516. The clustering procedure module 1514 includes computer-executable instructions that may be executed by the cluster comparison device 1510 to cause the cluster comparison device 1510 to perform one or more clustering procedures to cluster objects (e.g., assign the objects to respective clusters). The cluster comparison module 1516 includes computer-executable instructions that may be executed to cause the cluster comparison device to compare clusters created by a first clustering procedure to clusters created by a second clustering procedure, for example by generating an expected index (EI) or an adjusted index (AI) based on the clusters created by the first clustering procedure and the second clustering procedure. The cluster comparison module 1516 may be executed by the cluster comparison device to cause the cluster comparison device to perform the methods described herein.

The object storage device 1520 includes a CPU 1522, storage/RAM 1523, and I/O interfaces 1524. The object storage device also includes object storage 1521. Object storage 1521 includes a computer-readable medium that stores objects (e.g., images, video, documents) thereon. The members of the object storage device 1520 communicate via a bus. The cluster comparison device 1510 may retrieve objects from the object storage 1521 on the object storage device 1520 via a network 1530.

Figure 16A:
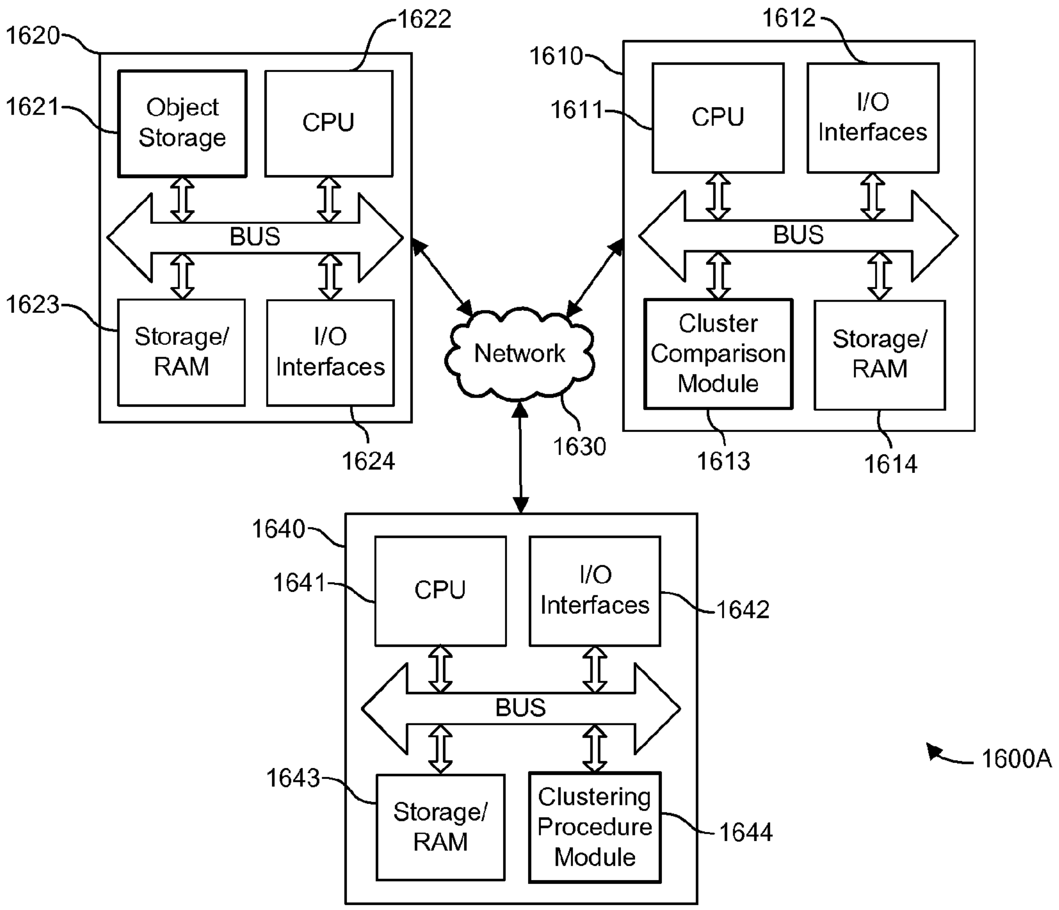
FIG. 16A is a block diagram that illustrates an example embodiment of a system for comparing object clusters.

FIG. 16A is a block diagram that illustrates an example embodiment of a system 1600A for comparing object clusters. The system includes a cluster comparison device 1610, an object storage device 1620, and a clustering device 1640. The cluster comparison device 1610 includes a CPU 1610, I/O interfaces 1612, a cluster comparison module 1613, and storage/RAM 1614. The object storage device 1620 includes a CPU 1622, I/O interfaces 1624, object storage 1621, and storage/RAM 1623. The clustering device 1640 includes a CPU 1641, I/O interfaces 1642, storage/RAM 1643, and a clustering procedure module 1644. The members of each of the devices communicate via a respective bus. In the embodiment shown in FIG. 16A, the clustering procedure device 1640 generates clusters using the clustering procedure module 1644. The clustering procedure device 1640 communicates with the object storage device 1620 via a network 1630 to access the objects in the object storage 1621. Thus, in this embodiment, different devices may store the objects, cluster the objects, and compare the clusters.

Figure 16B:
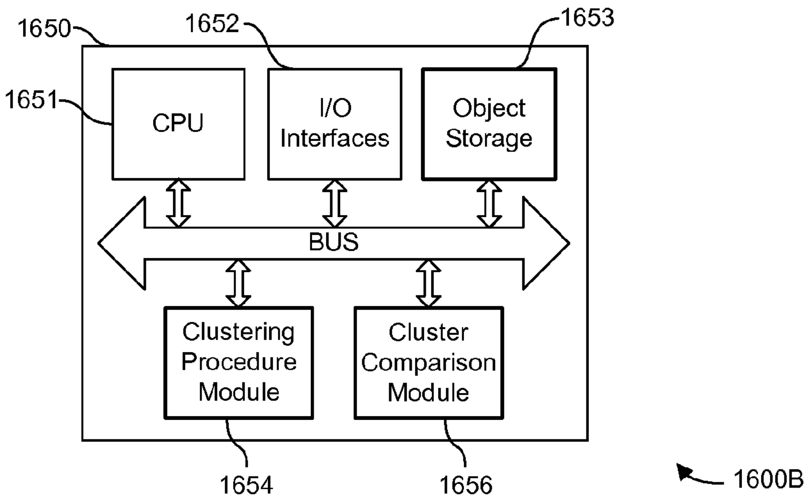
FIG. 16B is a block diagram that illustrates an example embodiment of a system for comparing object clusters.

FIG. 16B is a block diagram that illustrates an example embodiment of a system 1600B for comparing object clusters. The system includes a cluster comparison device 1650 that includes a CPU 1651, I/O interfaces 1652, object storage 1653, a clustering procedure module 1654, storage/RAM (not shown), and a cluster comparison module 1656. The members of the cluster comparison device 1650 communicate via a bus. Therefore, in the embodiment shown, one computing device stores the objects, clusters the objects, and compares the clusters. However, other embodiments may organize the components differently than the example embodiments shown in FIG. 15, FIG. 16A, and FIG. 16B.

The above described devices, systems, and methods can be achieved by supplying one or more storage media having stored thereon computer-executable instructions for realizing the above described operations to one or more computing devices that are configured to read the computer-executable instructions stored in the one or more storage media and execute them. In this case, the systems and/or devices perform the operations of the above-described embodiments when executing the computer-executable instructions read from the one or more storage media. Also, an operating system on the one or more systems and/or devices may implement the operations of the above described embodiments. Thus, the computer-executable instructions and/or the one or more storage media storing the computer-executable instructions therein constitute an embodiment.

Any applicable computer-readable storage medium (e.g., a magnetic disk (including a floppy disk, a hard disk), an optical disc (including a CD, a DVD, a Blu-ray disc), a magneto-optical disk, a magnetic tape, and a solid state memory (including flash memory, DRAM, SRAM, a solid state drive)) can be employed as a storage medium for the computer-executable instructions. The computer-executable instructions may be written to a computer-readable storage medium provided on a function-extension board inserted into the device or on a function-extension unit connected to the device, and a CPU provided on the function-extension board or unit may implement the operations of the above-described embodiments.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method for measuring similarity between a first set of clusters generated by a first clustering procedure and a second set of clusters generated by a second clustering procedure, wherein the clustering procedures are for grouping a set of objects, the method comprising:

applying a first clustering procedure and a second clustering procedure to a set of objects to cluster the objects into a first set of clusters and into a second set of clusters, respectively, wherein applying the first clustering procedure and the second clustering procedure comprises extracting object features from each object in the set of objects, determining one or more comparison measures by which to compare respective features of the objects in the set of objects, comparing the respective features of the objects in the set of objects based on the one or more comparison measures to determine differences between the respective features of the objects, outputting a group of measures representing the differences between the respective features of the objects, and clustering the objects into the first set of clusters and into the second set of clusters based at least in part on the group of measures;

calculating a similarity index between the first set of clusters and the second set of clusters;

calculating an expected value of the similarity index, wherein the expected value is a value of the similarity index one would expect to obtain, on average, between a randomly generated third set of clusters and a randomly generated fourth set of clusters with a same number of clusters as the first set of clusters and the second set of clusters, respectively; and adjusting the calculated similarity index by a penalty factor that includes the expected value of the similarity index.

2. A method according to claim 1, wherein the expected value of the similarity index is calculated based on random clusterings where every possible way to cluster the objects into the third set of clusters and fourth set of clusters is assumed to be equally likely.

3. The method according to claim 2, wherein a probability of a number of objects in any randomly generated cluster is given by the distribution $$P(b) = \frac{1}{K}\binom{N}{b}\frac{\left\{ {N-b \atop K-1} \right\}}{\left\{ {N \atop K} \right\}},$$

wherein b is a number of objects in the cluster, N is a total number of objects, K is a number of clusters, and $$\left\{ {n \atop k} \right\}$$

is a Stirling number or me second kind.

4. The method according to claim 1, wherein a probability of a number of objects in any randomly generated cluster is given by a binomial distribution $$P(b) = \binom{N}{b}\left(\frac{1}{K}\right)^{b}\left(\frac{K-1}{K}\right)^{N-b},$$

wherein K is a number of clusters, b is a number of objects in the cluster, and N is a total number of objects in the set of objects.

5. The method according to claim 4, wherein P(b) is set to 0 for some values of b.

6. The method according to claim 1, wherein the similarity index is calculated using mutual information between the first set of clusters and the second set of clusters.

7. The method according to claim 6, wherein an expected value of the mutual information is calculated according to $$EMI(R, C) = \sum_{a=1}^{N-R+1}\sum_{b=1}^{N-C+1}\left\{\frac{\left\{ N-a \atop R-1 \right\}}{\left\{ N \atop R \right\}}\binom{N}{b}\frac{\left\{ N-b \atop C-1 \right\}}{\left\{ N \atop C \right\}}\sum_{n=(a+b-N)^+}^{min(a,b)}\left[\binom{b}{n}\binom{N-b}{a-n}\frac{n}{N}\log\frac{nN}{ab}\right]\right\},$$

wherein R is a total number of clusters in the first set of clusters, C is a total number of clusters in the second set of clusters, and N is a total number of objects in the set of objects.

8. The method according to claim 6, wherein an expected value of the mutual information is calculated according to $$EMI(R, C) = \sum_{a=a_0}^{A}\sum_{b=b_0}^{N}\binom{N}{b}\frac{(R-1)^{N-a}}{R^{N-1}}\frac{(C-1)^{N-b}}{C^{N-1}}\sum_{n=(a+b-N)^+}^{min(a,b)}\binom{b}{n}\binom{N-b}{a-n}\frac{n}{N}\log\frac{nN}{ab},$$

wherein R is a total number of clusters in the first set of clusters, C is a total number of clusters in the second set of clusters, $a_0$ is a starting value of a, A is a final value of a, $b_0$ is a starting value of b, B is a final value of b, and N is a total number of objects in the set of objects.

9. The method according to claim 8, wherein $a_0=0$, A=N, $b_0=0$, and B=N.

10. The method according to claim 8, wherein $a_0=1$, A=N−R+1, $b_0=1$, and B=N−R+1.

11. The method according to claim 1, wherein the similarity index is calculated using a Rand Index between the first set of clusters and the second set of clusters.

12. The method according to claim 11, wherein the expected value of the similarity index is calculated according to $$EI(R, C) = \left(1-\frac{\left\{ N-1 \atop R \right\}}{\left\{ N \atop R \right\}}\right)\left(1-\frac{\left\{ N-1 \atop C \right\}}{\left\{ N \atop C \right\}}\right)+\frac{\left\{ N-1 \atop R \right\}}{\left\{ N \atop R \right\}}\frac{\left\{ N-1 \atop C \right\}}{\left\{ N \atop C \right\}},$$

wherein R is a total number of clusters in the first set of clusters, C is a total number of clusters in the second set of clusters, and N is a total number of objects in the set of objects.

13. The method according to claim 11, wherein the expected value of the similarity index is calculated according to $$EI(R, C) = \frac{(C-1)(R-1)+1}{RC},$$

wherein R is a total number of clusters in the first set of clusters and C is a total number of clusters in the second set of clusters.

14. The method according to claim 1, wherein the first clustering procedure and the second clustering procedure correspond to two instances of the same clustering procedure provided with different random initializations of objects.

15. The method according to claim 1, wherein the method is repeated while using the same first clustering procedure and varying the second clustering procedure, in order to find a clustering procedure which produces clusters maximally different from the first set of clusters.

16. A system for measuring similarity between a first set of clusters generated by a first clustering procedure and a second set of clusters generated by a second clustering procedure, the system comprising:

a non-transitory computer-readable medium configured to store computer-executable instructions; and one or more processors configured to cause the system to retrieve a set of objects from one or more computer-readable media, apply a first clustering procedure to the set of objects to sort the objects into a first set of clusters, wherein the first set of clusters has a first number of clusters and apply a second clustering procedure to the set of objects to sort the objects into a second set of clusters, wherein the second set of clusters has a second number of clusters, calculate a similarity index between the first set of clusters and the second set of clusters, calculate an expected value of the similarity index, wherein the expected value indicates an average value of the similarity index between a first plurality of randomly generated sets of clusters and a second plurality of randomly generated sets of clusters, wherein the sets of clusters in the first plurality of randomly generated sets of clusters have at most a same number of clusters as the first number of clusters, and wherein the sets of clusters in second plurality of randomly generated sets of clusters have at most a same number of clusters as the second number of clusters, and adjust the calculated similarity index by a penalty factor that includes the expected value of the similarity index, wherein applying the first clustering procedure and applying the second clustering procedures comprises extracting object features from each object in the set of objects, determining one or more comparison measures by which to compare respective features of the objects in the set of objects, comparing the respective features of the objects in the set of objects based on the one or more comparison measures to determine differences between the respective features of the objects, outputting a group of measures representing the differences between the respective features of the objects, and sorting the objects into the first set of clusters and into the second set of clusters based at least in part on the group of measures.

17. A system according to claim 16, wherein in the aggregate, the sets of clusters in the first plurality of randomly generated sets of clusters describe every possible arrangement of the objects into a number of clusters less than or equal to the first number of clusters; and in the aggregate, the sets of clusters in the second plurality of randomly generated sets of clusters describe every possible arrangement of the objects into a number of clusters less than or equal to the second number of clusters.

18. A system according to claim 16, wherein a respective number of objects in each of the clusters in the first plurality of randomly generated sets of clusters is within a first range;

a respective number of objects in each of the clusters in the second plurality of randomly generated sets of clusters is within a second range;

a number of shared objects between a cluster in the first plurality of randomly generated sets of clusters and a second cluster in the second plurality of randomly generated sets of clusters is within a third range, wherein the third range is based on the first range and the second range; and calculating the expected value of the similarity index comprises:

calculating a shared index for a first number of shared objects given a first number of objects in a cluster in the first plurality of randomly generated sets of clusters and a second number of objects in a cluster in the second plurality of randomly generated sets of clusters, and calculating a weight of the shared index given the first number of shared objects, the first number of objects in a cluster in the first plurality of randomly generated sets of clusters, and the second number of objects in a cluster in the second plurality of randomly generated sets of clusters.

19. A system according to claim 18, wherein calculating the expected value of the similarity index further comprises:

calculating a shared index for all numbers of objects within the third range given the first number of objects in a cluster in the first plurality of randomly generated sets of clusters and the second number of objects in a cluster in the second plurality of randomly generated sets of clusters; and calculating a respective weight of the shared index for all numbers of objects within the third range given the respective number of shared objects, the first number of objects in a cluster in the first plurality of randomly generated sets of clusters, and the second number of objects in a cluster in the second plurality of randomly generated sets of clusters.

20. A system according to claim 19, wherein calculating the expected value of the similarity index further comprises:

calculating a respective weight for the numbers of objects in the first range; and calculating a respective weight for the numbers of objects in the second range.

21. One or more non-transitory computer-readable media storing instructions that, when executed by one or more computing devices, cause the one or more computing devices to perform operations comprising:

performing a first clustering procedure on a set of objects to generate a first set of clusters and performing a second clustering procedure on the set of objects to generate a second set of clusters;

calculating a similarity index between the first set of clusters and the second set of clusters;

calculating an expected value of the similarity index, wherein the expected value is a weighted average of possible values of the similarity index between a randomly generated third set of clusters and a randomly generated fourth set of clusters, wherein the third set of clusters has a same number of clusters as the first set of clusters and the fourth set of clusters has a same number of clusters as the second set of clusters; and modifying the calculated similarity index by a penalty factor that includes the expected value of the similarity index, wherein performing the first cluster procedure and performing the second clustering procedure comprises extracting object features from each object in the set of objects, determining one or more comparison measures by which to compare respective features of the objects in the set of objects, comparing the respective features of the objects in the set of objects based on the one or more comparison measures to determine differences between the respective features of the objects, outputting a group of measures representing the differences between the respective features of the objects, and generating the first set of clusters and the second set of clusters based at least in part on the group of measures.

22. The one or more non-transitory computer-readable media of claim 21, wherein the expected value is a weighted average of all possible values of the similarity index between a randomly generated third set of clusters and a randomly generated fourth set of clusters.

23. The one or more non-transitory computer-readable media of claim 21, wherein a number of objects in a certain cluster may be zero.

24. The one or more non-transitory computer-readable media of claim 21, wherein the weighted average assumes all possible randomly generated third sets of clusters are equally likely and all possible randomly generated fourth sets of clusters are equally likely.

* * * * *